March 5, 1946. J. E. KANE 2,396,178
HAT MAKING APPARATUS AND METHOD OF OPERATING SAME
Original Filed July 8, 1940 7 Sheets-Sheet 1

INVENTOR
John E. Kane
BY
Blair, Curtis & Hayward
ATTORNEYS

March 5, 1946.  J. E. KANE  2,396,178

HAT MAKING APPARATUS AND METHOD OF OPERATING SAME

Original Filed July 8, 1940    7 Sheets-Sheet 6

INVENTOR
John E. Kane
BY Blair, Curtis & Hayward
ATTORNEYS

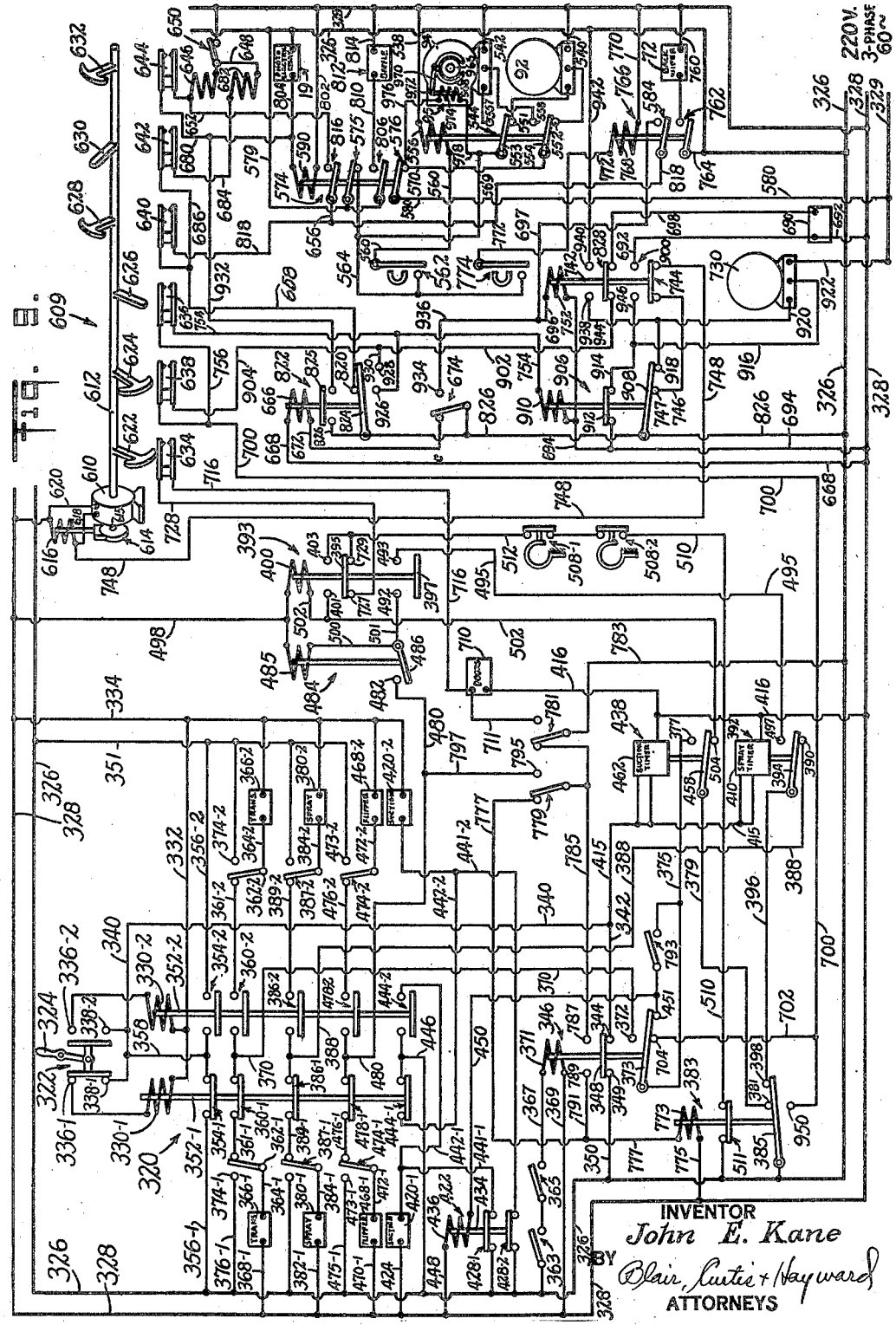

Patented Mar. 5, 1946

2,396,178

UNITED STATES PATENT OFFICE 2,396,178

HATMAKING APPARATUS AND METHOD OF OPERATING SAME

John E. Kane, Bethel, Conn., assignor to The Frank H. Lee Company, Danbury, Conn., a corporation of Connecticut Original application July 8, 1940, Serial No. 344,338, now Patent No. 2,357,475, dated September 5, 1944. Divided and this application December 29, 1942, Serial No. 470,473

13 Claims. (Cl. 19—148)

This invention relates to the handling of fur and more particularly to an apparatus and a method for supplying fur to a bat-former cone to thereby form hat bodies or bats from the fur.

An object of this invention is to provide apparatus for handling fur in a carefully controlled and efficient manner to form hat bats, for example upon perforated cones. Another object is to provide a method and apparatus for handling fur and the dividing of fur into predetermined amounts. A still further object is to provide a method and apparatus of the above character for supplying fur in predetermined quantities to the cones of a bat-former in a dependable and efficient manner. A further object is to provide apparatus of the above character for receiving bulk fur and producing from this fur bats of standard high quality and of proper size and weight. Another object is to provide apparatus which is compact and sturdy in construction and efficient and dependable in operation. A still further object is to provide a thoroughly practical and dependable method of operation and control for apparatus of the above character. These and other objects will be more fully pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the drawings:

Figure 7 being a sectional view, and Figure 8 being a fragmentary plan view;

Figure 9 is a schematic wiring diagram showing the control circuit for the apparatus of Figure 1.

Figure 1:
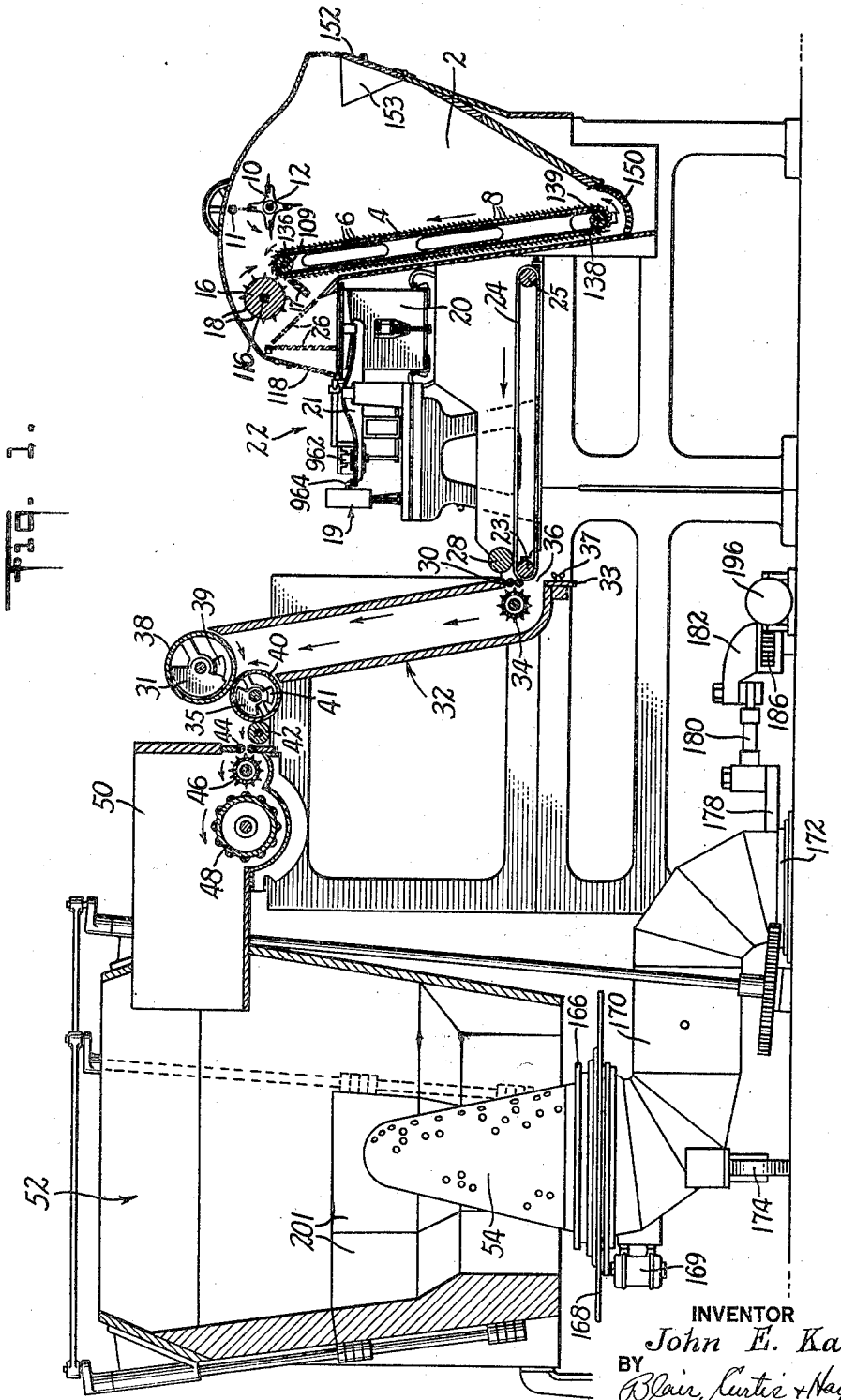
Figure 1 is a vertical longitudinal section of one embodiment of the invention with certain of the structure broken away and with certain details omitted for clarity.

This application is a division of my copending application, Serial No. 344,338, filed July 8, 1940, and issued on September 5, 1944, as Patent No. 2,357,475. This copending application was a continuation-in-part of my application, Serial No. 264,903, filed March 30, 1939, entitled "Hat making apparatus," and issued July 9, 1940, as Patent No. 2,207,407. As stated in this patent, some of the apparatus disclosed therein is similar to that disclosed in United States Patent No. 2,172,343 to George T. Birdsall. The present application likewise discloses certain apparatus which is related to certain of the apparatus disclosed in this Birdsall patent.

In making felt hats, the fur is treated by a process known as "carroting" so that the fur acquires felting characteristics and in that condition, the fur is deposited in a thin layer upon a large cone to form a hat body or bat. When being deposited, the fur forms into a loose sheet over the entire cone, and after being removed from the cone, the bat is worked and treated so that it "felts" and shrinks. When the bat has reached the proper size, it is subjected to further processing to thereby shape it and prepare it as a finished hat. It is important that the hat bats be of uniform weight and of high quality so that the processing of the bats will be uniform and so that the finished hats will be of smooth, even felt which is durable. In obtaining these results, the amount of fur deposited to form each bat must be carefully measured, and the fur must be deposited in a uniform manner over the cone. In practice, the fur is thrown into the top of the forming tower and falls downwardly onto the cone. The cone is perforated, and suction within the cone draws air in through the perforations so that, as the individual hairs fall, they are drawn against the cone.

When the fur is thrown into the top of the forming tower, each individual hair should move independently of the other hairs so that the fur will be deposited on the cone in an even layer. Thus the individual hairs should be thoroughly separated at the time they reach the forming tower. When the fur is stored or handled in bulk, it is often rolled and worked to an extent that the hairs tend to mat. Accordingly, it is important that, prior to being deposited upon the cone, the fur be thoroughly separated, as by successive picking operations.

Illustratively, the fur is stored in bulk form, and when it is to be used, it is placed in a hopper. From this hopper, the fur is dispensed to a weigher, and control mechansim is provided which accurately controls the supplying of fur to the weigher and the dumping of the weighed quantities of fur from the weigher. Each of these individual quantities of fur is sufficient to form a hat bat, and is carried from the weigher to the forming tower where it is deposited upon a cone. In the present embodiment, the steps of moving the fur from the hopper and delivering the fur to the forming tower are utilized to carefully separate the fur so that the individual hairs fall onto the cone in the manner referred to above. After a quantity of fur sufficient to form a bat is deposited upon the cone, the cone is removed from the forming tower, and the bat is wetted and stripped from the cone for further operations.

The various steps of this process are properly correlated in the present embodiment so that the entire mechanism operates as a unit. Thus the fur-moving and weighing operations, and the operations of the bat-forming tower and the associated parts, are correlated to thereby produce bats in an efficient manner. This result is obtained by providing a central unified controller which depends mainly upon electrically operated solenoid units, some of which in turn control air and water valves and air-pressure systems.

The fur is removed from the hopper and delivered to the weigher at a variable rate which rate is automatically controlled. During the delivery of fur to form each of the predetermined quantities, the initial amount of fur is delivered to the hopper of the weigher at a rapid rate, and when the fur in the hopper approaches the desired quantity, the rate of delivery is automatically reduced. In this manner, the major portion of each quantity of fur is quickly delivered to the hopper, and the total time required to deliver a quantity of fur to the hopper is thereby materially reduced. However, at the end of the weighing operation, the rate of fur delivery is very slow so that the supply of fur is stopped at the exact time that the proper amount is delivered to the scales hopper, and as a result, the quantity of fur is not overweight or underweight. Thus, the reduction in the time necessary for performing the weighing operation does not impair the accuracy of the weighing operation.

By providing suitable control mechanism and suitable variable means for delivering fur to the weigher, the weigher completes its weighing operation before the completion of the step of depositing the previously weighed quantity of fur on the cone. This makes it possible to more accurately correlate the various operations of the apparatus as the time of weighing is readily adjusted to meet the other conditions of use. In addition to this, the various operations of the entire apparatus are interrelated through the control mechanism to give great flexibility of action. Thus, the apparatus normally completes the cycle of operation in a minimum length of time, but if one portion of the apparatus encounters a delay, the control mechanism continues to supervise the other operations without undue loss of time.

Referring particularly to the right of Figure 1, a hopper 2 is provided with a vertically extending apron 4 which is in the form of an endless belt built up of strips 6 each of which is provided with a plurality of barbs 8. Apron 4 moves, as indicated by arrows, with the right-hand side moving upwardly and carries fur from the hopper. Barbs 8 are rigidly set in their respective strips at an angle, extending toward the direction of movement. Thus, they tend to grab and retain the fur as they move upwardly, and as a result, they carry a layer of fur upwardly from the hopper.

Adjacent the top of the apron and to the right thereof is a rapidly rotating back wiper 10 which is formed of four barb-carrying strips evenly spaced about a shaft 12. Back wiper 10 rotates counterclockwise with the side adjacent apron 4 moving opposite to the direction of movement of the apron. Thus, the barbs on wiper 10 scrape excess fur from the barbs 8 of apron 4 and permit only a layer of a controlled thickness to move from the hopper.

To the left of the top of apron 4 is mounted a front wiper 16 which is a wooden roller carrying a plurality of barbs 18. Below front wiper 16 is a deflector plate 17 which deflects the fur away from the downwardly moving apron 4. Front wiper 16 rotates very rapidly with respect to the movement of apron 4, and as the layer of fur is carried to the front wiper, it is picked from the apron by barbs 18, and the fur is thereby thoroughly separated.

This finely divided fur falls from front wiper 16 over the top of deflector plate 17 and down to the hopper 20 of the balance scale mechanism, generally indicated at 22. Hopper 20 is provided with a dumping bottom which is controlled by solenoids in a manner more clearly pointed out below. When the proper amount of fur has been delivered to the scale hopper, the dumping mechanism is operated, and the fur falls onto an endless belt 24 which extends between a pair of rollers 23 and 25. During the dumping operation, fur is diverted from the top of the scale hopper by a baffle 26 which is of a heavy mesh screen and which normally hangs in the vertical position shown, but which is moved to the broken-line position when the proper quantity of fur has been delivered to the hopper, and it is held in this broken-line position while the dumping mechanism operates. The fur is carried to the left on apron 24, and at the left, it moves under an idler roller 28 to a pair of feed rollers 30.

As the fur emerges from the left of the feed rollers, it enters the bottom of a vertically extending chute or passageway, generally indicated at 32; this passageway extends the entire width of the machine. Within this passageway and adjacent feed rollers 30 is a rapidly rotating picker 34 which rotates clockwise and separates the fur and impels it with a stream of air upwardly within the passageway. Below the picker, passageway 32 is provided with an adjustable air inlet 36, and picker 34 rotates at such a rate that air moves in through inlet 36 and up the passageway. The size of inlet 36 is varied by moving plate 33 vertically; plate 33 is adjustably held in position by a plurality of thumb-nuts 37.

Extending along the top of passageway 32 are two perforated sieve-rollers 38 and 40 which extend the width of the machine and totally close the top of the passageway. The perforations in these sieve-rollers form an air outlet for the air which is drawn in at the bottom of the passageway, and, as the air escapes, the fur impelled upwardly by picker 34 and entrained in the air moves against the sieve-rollers 38 and 40 forming layers of fur thereon. Sieve-roller 38 rotates clockwise, and sieve-roller 40 rotates counterclockwise, and the two layers of fur formed on the two sieve-rollers combine where the rollers meet into a single layer of fur which is carried over the top of sieve-roller 40 and is fed by a roller 42 into a pair of feed rollers 44. As the layer of fur emerges at the left of feed rollers 44, it is caught by a top picker 46, and the fur is completely subdivided and moves over roller 48 to the left.

In this embodiment, sieve-rollers 38 and 40 are provided with internal baffles 31 and 35, respectively, which extend the length of the sieve-rollers and which deflect the air toward the ends of the sieve-rollers. Baffle 31 is rockably mounted by means of a web structure upon the shaft of the sieve-roller 38, but rotation of the baffle is prevented by a downwardly extending weight 39. Baffle 31 extends from where the two sieve-rollers meet to the top of sieve-roller 38. Likewise, baffle 35 extends from where the two sieve-rollers meet to where sieve-roller 40 is adjacent roller 42, and is mounted on the shaft of sieve-roller 40 with a weight 41 to prevent rotation of the baffle. Accordingly, the air enters the sieve-rollers from passageway 32 and deposits the layers of fur on the sieve-rollers, but in escaping, the air moves to the ends of the baffles. As a result, the escaping air does not disturb the fur which is moving over the top of sieve-roller 40 and across roller 42 to feed rollers 44.

Top picker 46 and roller 48 are enclosed in a chute 50 which extends to the top of the forming tower, generally indicated at 52. Forming tower 52 encloses a perforated cone 54 which is movably supported upon a rotating base and which is provided with an internal suction in a manner more fully pointed out below. Top picker 46 and roller 48 are so adjusted that when fur is being deposited, the fur moves in a steady stream from chute 50 into the top of forming tower 52 and downwardly toward the perforated cone 54. The suction on cone 54 is sufficient to draw the individual hairs onto the cone, and a bat is formed of uniform thickness throughout.

When the quantity of fur to form a bat has been deposited upon a cone, the sieve-rollers 38 and 40 are stopped, and fur is no longer delivered to the forming tower 52. The two sets of vertically swinging doors 201 of forming tower 52 then open, and the cone with the bat thereon is swung out of the forming tower. Simultaneously, another cone is moved into the forming tower and the forming tower doors are closed again. The sieve-rollers 38 and 40 are restarted at the proper time to start delivery of fur to the cone within the forming tower as soon as the doors are reclosed.

The cone with the bat thereon is moved to a sprayer (not shown) and the bat is sprayed with hot water, whereupon an automatic flipper means inverts the cone and the bat is stripped from the cone. The empty cone is returned to its position at the side of the forming tower and is ready again for use. During the movement of the cone from the forming tower with the bat thereon, full suction is maintained on the cone, but when the bat becomes partially wetted, this suction is reduced. Full suction is again placed upon the cone at the time the cone is returned to the forming tower.

The specific mechanism for wetting the bat and for moving the cone between the forming tower and the wetting station, as well as between the wetting station and the bat-removing station, is explained in detail in my copending application, referred to above. This mechanism, as well as its control means is discussed more fully below, and except as pointed out, the apparatus is illustratively the same as that shown in my copending application. For the sake of brevity and clarity, certain details are omitted from the present showing, though certain of this structure will be described briefly. It should be noted that in the embodiment of my copending application as well as in the present embodiment, a single forming tower is provided and there are two cones which are alternately moved into the forming tower. Each cone is provided with its own suction means as well as its own bat-wetting and bat-removing mechanism.

In Figure 1, one of these cones, 54, is shown positioned in the forming tower to receive fur to form a bat. Cone 54 is mounted on a rotatable base 166 which is mounted upon a circular frame 168. Mounted below frame 168 is a motor 169 which is provided with a gear at the upper end of its shaft co-operating with a ring gear on the rotatable base 166. During the time that fur is being deposited upon the cone and during the wetting operation, motor 169 rotates the cone so that fur is evenly deposited upon the cone and so that the bat is evenly wetted.

Frame 168 is rigidly mounted upon the top of a pipe 170 which extends to a sealing ring 172 on the floor and which is connected to a suction fan (not shown). Suction pipe 170 is adapted to swing about the sealing ring 172 and the swingable left-hand end of the suction pipe is supported by a pair of rollers 174. Movement is imparted to suction pipe 170 by a crank 178 which is connected through a link 180 to a crank arm 182. Crank arm 182 is rigidly mounted upon the end of a stud shaft (not shown) and rigidly mounted upon the lower end of the stud shaft is a pinion 186 which cooperates with a rack (not shown). This rack is provided with a cylinder and piston unit at each of its ends, the cylinder 196 of one of these units appearing in Figure 1. Air is alternately supplied to these cylinder and piston units to move the rack back and forth and this movement of the rack rotates pinion 186 to thereby swing crank arm 182. In this manner, suction pipe 170 is swung back and forth through an arc with each of the cones being moved between its position within the forming tower and its wetting position.

Reverting to the weighing and conveying mechanism, the weighing mechanism is somewhat similar in construction and operation to that shown in my copending application referred to above. The fur is rapidly and accurately weighed by delivering fur to the hopper at a rapid rate during the time that the major portion of each quantity of fur is being delivered to the hopper and then delivering the fur at a slow rate when the amount of fur in the hopper approaches the desired weight. Accordingly, the weighing mechanism is provided with two individually operating sealed switches 774 and 562 (see Figure 9) which are sequentially closed when the scale-arm 21 makes the first movement toward the balanced position. This movement occurs when substantially the desired quantity of fur has been delivered to the scale hopper 20, with switch 774 closing approximately one and one-half seconds before the closing of switch 562. The closing of switch 774 raises the armatures of a relay switch 766 which moves back wiper 10 (Figure 1) toward apron 4 to thereby reduce the thickness of the layer of fur being presented to the front wiper 16 by the apron. The closing of switch 562 reduces both the speed of apron 4 and the speed of rotation of the front wiper, and the operating relationship between the various parts is such that the layer of fur of reduced thickness is presented to the front wiper 16 at the time the front wiper speed is reduced. As pointed out below, this manner of operation results in the fur being thoroughly separated and delivered to the scale hopper so that proper weighing occurs.

Mounted adjacent the left of the scale-arm 21 is a spot-light 962 and to the left of the spot-light is a photo-electric relay unit, generally indicated at 19. The spot-light 962 normally plays a beam of light upon the photo-electric cell, but when the scale-arm tips to the fully balanced position, a bracket 964 on the left end of the scale-arm intercepts this light beam. When this light beam is intercepted, the photo-electric cell operates switch units in a manner pointed out below to stop apron 4 and to raise baffle 26 to its broken-line position so that fur is deflected from the top of the hopper. Simultaneously, circuits are conditioned to permit the opening of the bottom-dumping mechanism of hopper 20, and if the other operations are completed, the bottom-dumping mechanism is opened to dump the fur on endless belt 24. The bottom-dumping mechanism then recloses and the baffle 26 is returned to its full-line position, so that fur again may be delivered to the hopper. Immediately, the delivery of the fur to the hopper is restarted and while the previously weighed quantity of fur is being conveyed to the forming tower and deposited upon the cone, a new quantity of fur is being weighed and dumped onto endless belt 24.

During the actual weighing of the fur, no fur is deposited on endless belt 24, and thus the fur moves to feed rollers 30 and forward to the forming tower in definitely divided quantities which are spaced apart sufficiently to allow for any abnormal conditions in the conveying of any particular quantity of fur. As will be more fully explained below, sieve-rollers 38 and 40 are stopped at a predetermined time in the timing cycle prior to the opening of doors 201. This permits all of the fur which is passed by the sieve-rollers to move through feed rollers 44 and beyond picker 46 to the cone in the forming tower before the doors are opened. Likewise, during normal operation, sieve-rollers 38 and 40 are started prior to the closing of the doors; and at the time the doors are closed, fur starts collecting on the cone without delay.

During the time that the sieve-rollers are stopped, a portion of the quantity of fur to form the next bat is collected on the sieve-rollers and, in fact, any stray fur which may be present is collected in this manner. When the sieve-rollers are restarted, this layer of fur is immediately fed through feed rollers 44 to picker 46 and thence to the forming tower. This initial quantity of fur deposited upon the empty cone is sufficient to form a thin layer of fur over the entire cone. This effectively prevents the fur from being drawn through the perforations in the cone as might occur if the feeding of the fur to the cone were started slowly. The quantity of fur initially delivered to the cone in this manner is regulated by controlling the amount of fur delivered to the sieve-rollers while they are stopped.

As indicated above, each quantity of fur is rapidly and accurately weighed by delivering the fur to the hopper 20 at a rapid rate during the time that the major portion of the fur is being delivered to hopper 20 and delivering the fur at a slow rate when the amount of fur in hopper 20 approaches the desired quantity. In the embodiment disclosed, this result is obtained by reducing the speed of apron 4 so that the layer of fur is presented to front wiper 16 at a slow rate, and in addition, the back wiper 10 is moved closer to the apron so that a thinner layer of fur is presented to the front wiper. By combining these two actions, the fur is delivered to the scale hopper in a reliable manner and in a minimum of time. Under some circumstances, it is desirable to omit either the step of reducing the speed of apron 4 or the step of moving the back wiper. The time in the weighing cycle when the reduction in the speed of feeding fur occurs is adjusted depending upon the characteristics of the fur being weighed and upon the weight of the bat being formed by the machine.

In this embodiment, back wiper 10 is swung through an arc to and from the apron, but the axis of rotation is maintained parallel to the top of the apron. Accordingly, the back wiper shaft 12 extends (see Figure 2) beyond the hopper side walls through arcuate slots 60 (see also Figure 3) with the ends of the shaft supported by swinging arms 13 and 15 (Figure 4). Shaft 12 is mounted in these arms in the manner shown in Figure 5, there being for each arm a double ball-bearing unit 61 with oil seals, and the upper end of the arms being rigidly carried on the ends of a pivot shaft 11. Pivot shaft 11 is rockably mounted in suitable sleeve bearings 63 in the side walls of the hopper.

As shown best in Figure 4, the back wiper shaft 12 is normally held away from the apron 4 (to the left in Figure 4) by a coil spring 72, the left end of which engages a lug 74 on the lower end of arm 15. The other end of spring 72 (see also Figure 2) is adjustably retained by a bracket 71 upon the base frame. At the left (Figure 4) arm 15 is limited in its movement by the engagement of lug 74 with an adjustable stop unit 76 which is adjusted by turning a thumb screw 79 and which is then locked by means of a lock nut 77.

Figure 3:
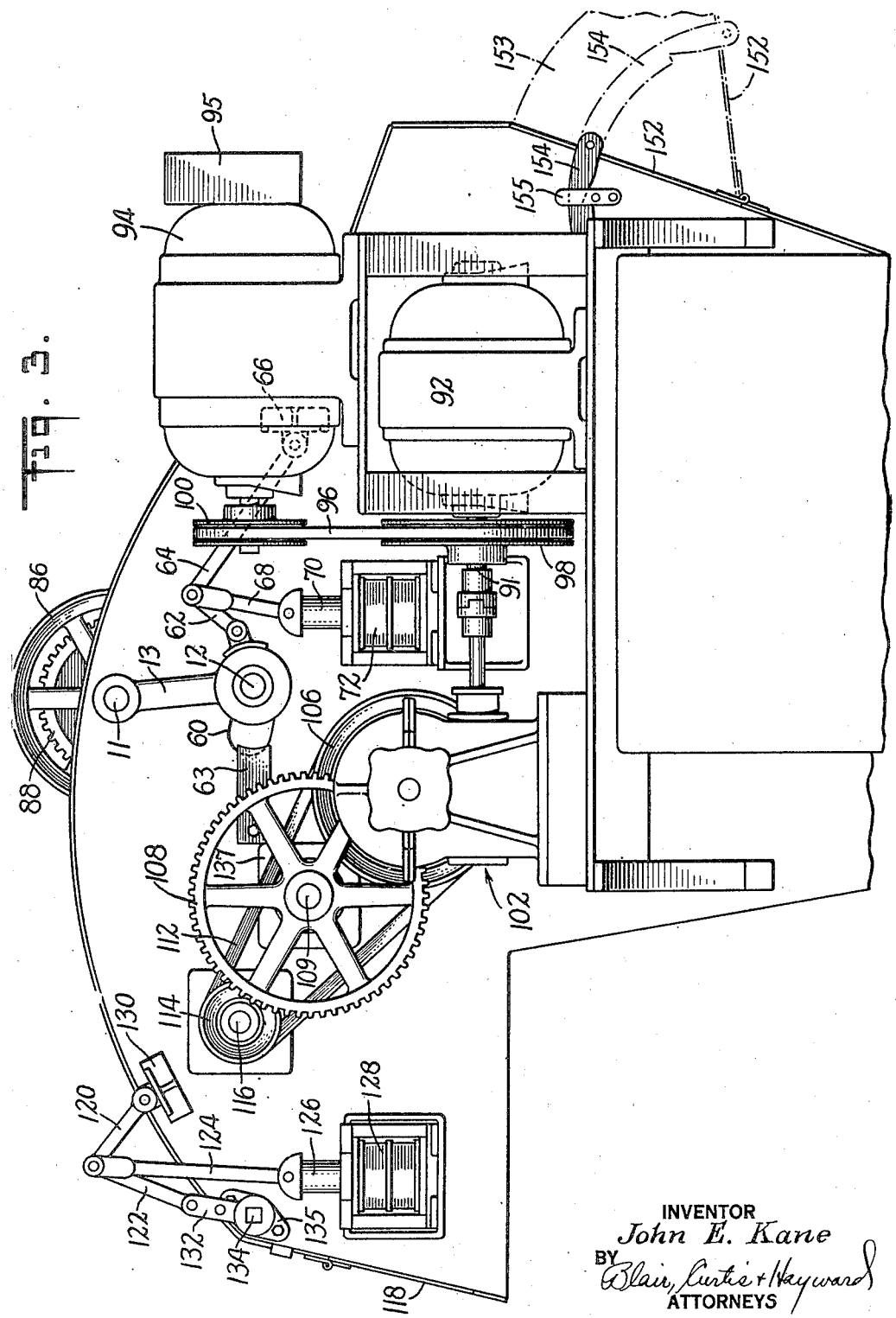
Figure 3 is an elevation from the left-hand side of Figure 2.
Figure 4:
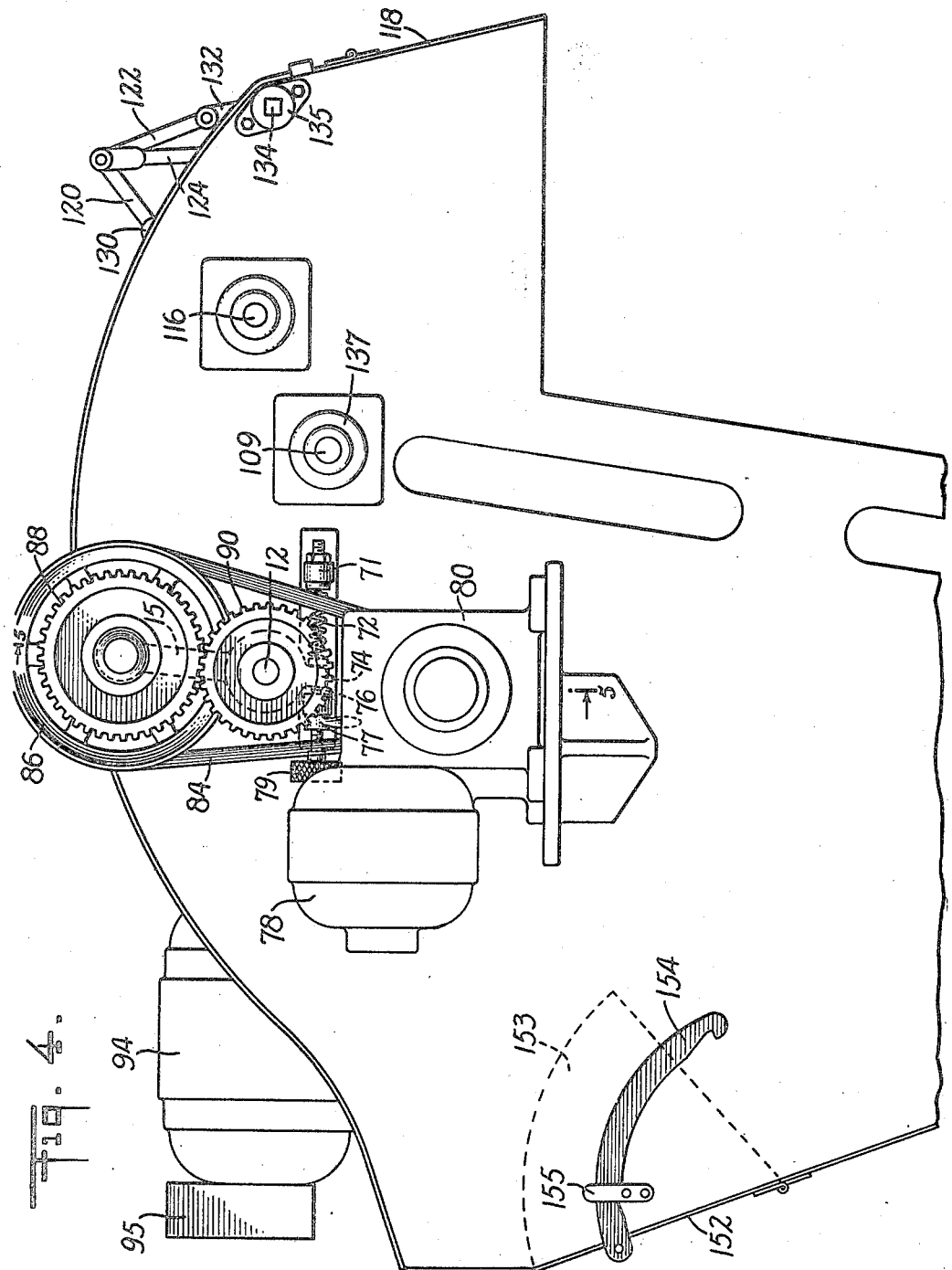
Figure 4 is an elevation from the right-hand side of Figure 2.

The back wiper is moved from its position away from apron 4 to its position adjacent apron 4 by a toggle unit shown in Figure 3. This toggle unit comprises a short link 62 which is pivoted to the lower end of arm 13 and a long link 64 which is pivoted to the right-hand end of link 62 and to a fixed bracket 66 (shown in dotted lines) on the base frame. At the juncture of links 62 and 64, an operating arm 68 is pivoted and extends downwardly with its lower end attached to an armature 70 of a solenoid unit having a solenoid 72. These elements are normally held in the position shown, but when solenoid 72 is energized, armature 70 is pulled downwardly with link 64 swinging about its right-hand end, and with the left-hand end of link 62 moving to the left and swinging the back wiper toward the apron. The amount of movement imparted to the back wiper by the energization of solenoid 72 (Figure 3) may be adjusted by changing the length of link 64. This movement is limited by a fixed stop 63 which prevents the back wiper from moving too closely to the apron.

Figure 2:
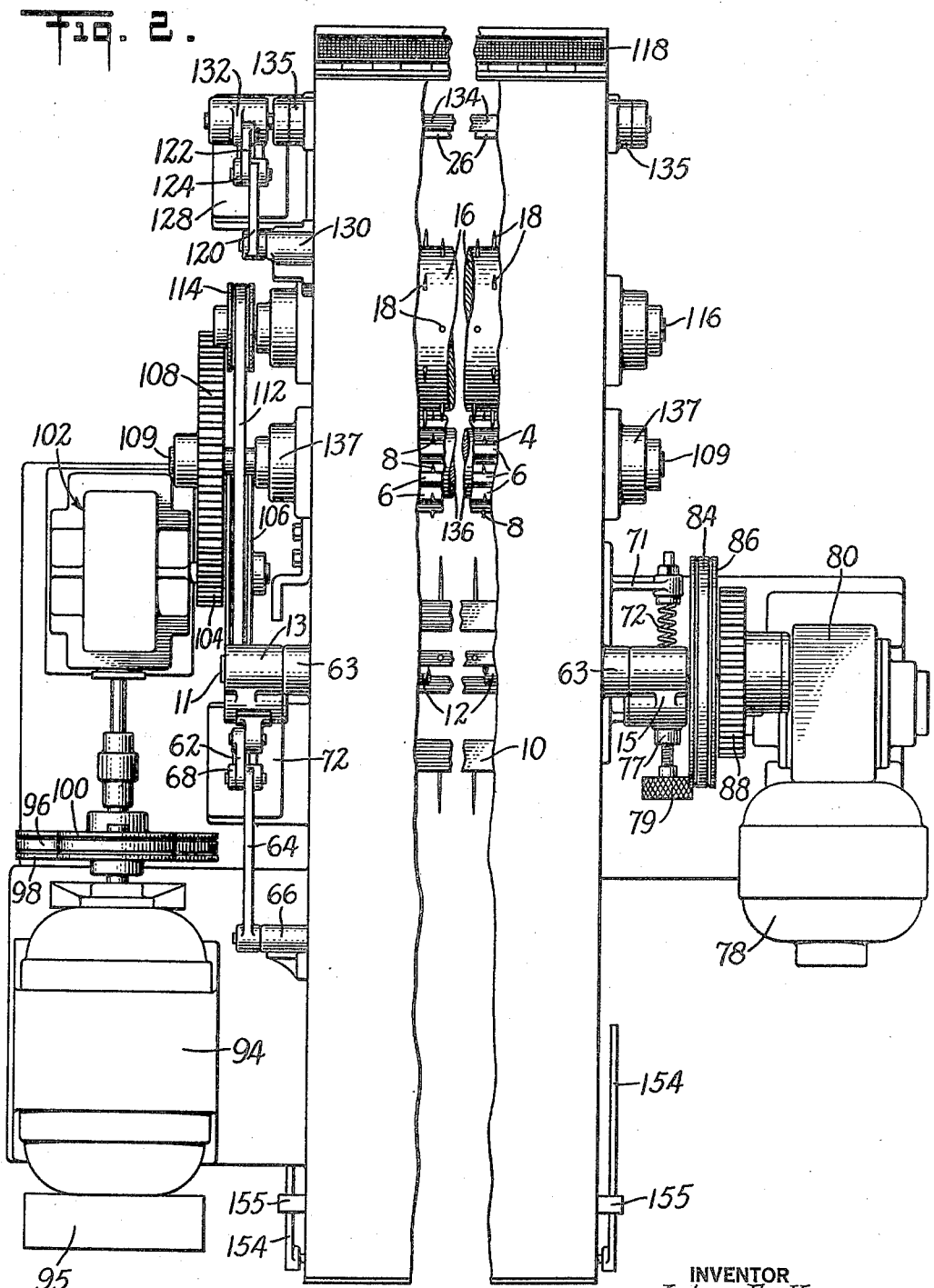
Figure 2 is an enlarged plan view of the apparatus for removing fur from the fur hopper at the right-hand side of Figure 1, with the central portion of the hopper omitted.
Figure 5:
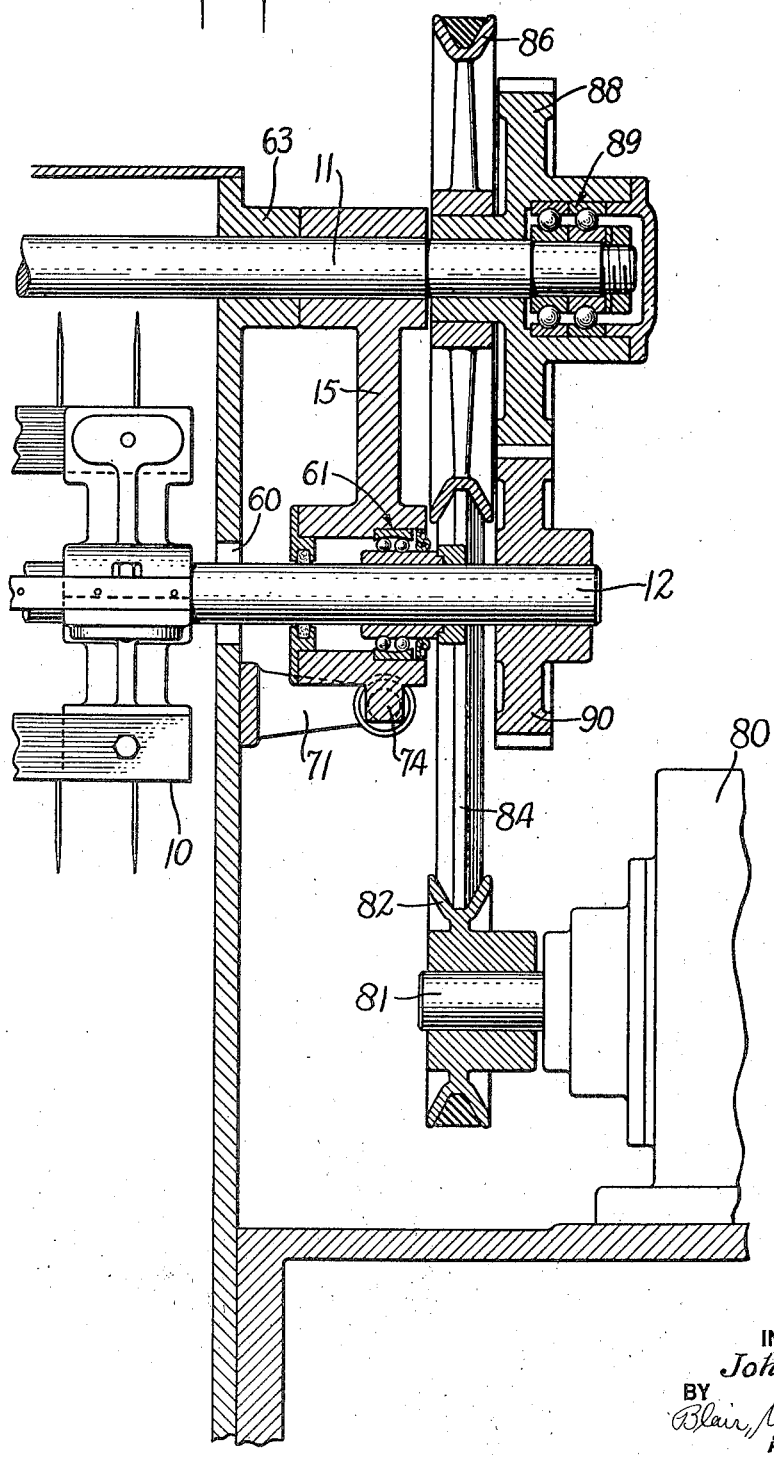
Figure 5 is a vertical longitudinal section on the line 5—5 of Figure 4.

Rotation is imparted to back wiper 10 in the manner shown best in Figures 2, 4 and 5, power being received from a motor 78 (Figure 2) through a speed-reduction unit 80. Referring to Figure 5, the power output shaft 81 of the speed-reduction unit 80 carries a sheave 82 which is drivingly connected through a V-belt 84 to a sheave 86. Sheave 86 is mounted upon and keyed to the hub of a gear 88 which is rotatably mounted by means of a double ball-bearing unit 89 on the end of shaft 11. Gear 88 meshes with a gear 90 keyed to the end of shaft 12. Power from motor 78 is thus transmitted through the gear-reduction unit 80, sheave 82, V-belt 84, sheave 86, and gears 88 and 90, to shaft 12. As shown best in Figure 4, this type of power-transmission unit does not interfere with the swinging movement of the back wiper shaft 12. For example, assuming that the back wiper is not rotating, the movement of the back wiper shaft 12 to the right (Figure 4) merely causes gear 90 to roll upon gear 88 a distance equal to the arc through which shaft 12 is swung. This causes a slight rotation of the back wiper which rotation has no harmful effect. If the back wiper is being rotated during such swinging movement, the only effect is a negligible momentary change in the speed of rotation.

The means for imparting movement to apron 4 is best shown in Figures 2 and 3, there being (Figure 3) a fast speed motor 92 and a slow speed motor 94 which are connected by means of a V-belt 96 which is carried by a sheave 98 on the shaft of motor 92 and a sheave 100 on the shaft of motor 94. The shaft 91 of motor 92 is mechanically connected at the left to a speed-reduction unit 102 which (see Figure 2) carries upon its power output shaft a gear 104 and a sheave 106. Gear 104 meshes with a gear 108 (Figures 2 and 3) which is keyed to the shaft 109 (Figure 3) carrying the top of apron 4 (Figure 1). Sheave 106 is connected by means of a V-belt 112 to a sheave 114 which is keyed to (Figure 3) the shaft 116 which carries front wiper 16. Motors 92 and 94 both rotate so as to turn shaft 109 counterclockwise, and shaft 116 clockwise. When motor 92 is operating, apron 4 is moved at a rapid rate and front wiper 16 is rotated rapidly so that fur is delivered to the scale hopper at a fast rate. When, as will be explained more in detail below, the quantity of fur in the hopper approaches the desired amount, motor 92 is turned off and motor 94 is turned on. At this time, power from motor 94 is transmitted through sheave 100, V-belt 96 and sheave 98 to the shaft 91 of motor 92 and thence to shaft 109 of the apron and to shaft 116 of the front wiper. The slow speed of motor 94 causes apron 4 and front wiper 16 to move slowly, and fur is delivered to the scale hopper at a slow rate until the desired weight is reached. At this time motor 94 is deenergized, stopping the apron and the front wiper.

When the front wiper is being rotated rapidly, it impels a considerable blast of air downwardly, and as shown in Figure 1, this blast of air is directed against the scale hopper. This blast of air upon the scale gives an artificial reading on the scale so that the scale tends to indicate that there is more fur in the hopper than is present. This condition may be compensated for by adjusting the scale, but nevertheless, it is especially objectionable when the amount of fur in the scale hopper approaches the desired quantity as the scale would tend to trip too soon with the result that a light-weight bat would be produced by the machine. The effect of this blast of air is reduced by providing at the left of the top of the scale hopper a grill-work 118, through which the air readily escapes. As indicated above, baffle 26 is of wire mesh and does not interfere with the flow of air. In addition to this, with the present apparatus, when fur is being delivered to the scale hopper at a slow rate, the rate of rotation of the front wiper is substantially reduced so that the effect of the blast of air is negligible. Thus, as indicated above, the front wiper is driven by motors 92 and 94, and at the time the speed of the apron is reduced, the speed of the front wiper is also reduced. In this manner, the effect of the blast of air from the front wiper upon the weighing mechanism is negligible during the time that the final amount of each quantity of fur is being delivered to the scale hopper.

Under some conditions of operation, it is quite important that the speed of apron 4 and front wiper 16 be reduced promptly when the approximate weight of fur is reached. This makes it possible to more accurately adjust the apparatus so that substantially all of the fur is delivered to the scale at the rapid rate and then only a very small quantity is delivered to the scale at the slow rate. In the present embodiment, motors 92 and 94 are three-phase motors, and when the drive is shifted from motor 92 to motor 94, motor 94 initially tends to act as a brake to reduce the speed of the apparatus to the synchronous speed of motor 94. Thus, the change from fast speed to slow speed is prompt and dependable, and the moving parts do not tend to coast. On the right-hand end of motor 94 is a solenoid-operated brake unit 95 which is automatically released when the motors are started, and which is effective when the motors are turned off to immediately stop rotation, all in a manner more fully discussed below.

As indicated above, baffle 26 (Figure 1) is raised to the broken-line position to stop the flow of fur to the weigher when the desired quantity of fur to form a bat has been delivered to the weigher. The baffle is lifted to this position by an operating unit shown at the left of Figure 3. This operating unit is formed by a toggle having a pair of links 120 and 122 which are pivoted together and are connected to an operating arm 124 which carries at its lower end the armature 126 of a solenoid unit having a solenoid 128. The right-hand end of link 120 is pivoted to a fixed bracket 130 and the left-hand end of link 122 is pivoted to an operating lever 132. Operating lever 132 is fitted onto the end of a bar 134 which extends across the machine (see Figure 2) and rigidly carries the baffle 26. Bar 134 is rockably mounted in a pair of bearing units 135 carried by the base frame, so that the baffle may be swung as indicated in Figure 1 from the full-line position to the broken-line position.

When solenoid 128 (Figure 3) is not energized the baffle hangs vertically, and the members assume the position shown. During operation, when sufficient fur to form a bat has been delivered to hopper 20 of the weigher, solenoid 128 is energized so that armature 126 is drawn downwardly into the solenoid. This pulls operating arm 124 downwardly and swings links 120 and 122 toward their position of alignment. Thus, link 120 swings about its right end and the left end of link 122 is moved to the left, thereby swinging operating lever 132 and bar 134 counterclockwise. At the limit of movement of armature 126, links 120 and 122 are in substantial alignment and the baffle is in its raised position. When solenoid 128 is deenergized, the baffle is returned by gravity and carries the other elements to their respective positions.

Figure 6:
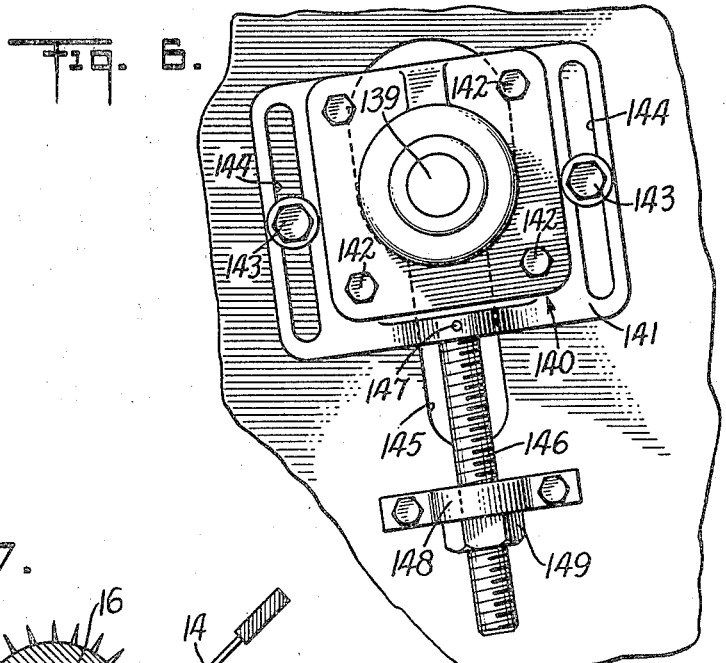
Figure 6 is an elevation of the means for adjusting the tension on the feeder apron.

Referring again to Figure 1, apron 4 is mounted at the top upon a roller 136 which is carried at its ends (see Figure 2) by a pair of bearing units 137 which receive the roller shaft. The bottom of apron 4 (Figure 1) is carried by a similar roller 138 which has a shaft 139, each end of which is mounted in an adjustable bearing unit, shown in Figure 6 and indicated at 140. Bearing unit 140 is secured to an adjusting bracket 141 by four stud bolts 142, and adjusting bracket 141 is in turn mounted upon the hopper end wall by a pair of adjusting stud bolts 143, each of which extends to the base frame through a slot 144 in the adjusting bracket. The roller shaft 139 extends through a slot 145 in the end wall of the hopper so that when stud bolts 143 are loosened, bracket 141 may be adjusted so that roller 138 is positioned to give the proper tension to apron 4.

In order to accurately and conveniently adjust the position of bracket 141, an adjusting bolt 146 is provided. Adjusting bolt 146 has its upper end attached to the adjusting bracket by means of a pin 147 and has its lower end extending through a hole in a bracket 148 which is rigidly carried on the base frame. A nut 149 is threaded onto the adjusting bolt and is turned to pull the bolt and the adjusting bracket downwardly. This movement is against the tension of apron 4 so that the apron is tightened by the tightening of the nut. If the apron is too tight, nut 149 is loosened and the apron pulls the bracket upwardly to the proper position. When the proper tension is obtained upon the apron, set screws 143 are tightened and the roller 138 is thus held in the adjusted position.

The bottom of the hopper is provided with a hinged grating unit 150 (Figure 1) which collects foreign materials and permits small material to fall from the hopper; the grating unit may be opened to permit access to the bottom of the hopper. Fur is delivered to the hopper through a swinging door 152 which is hinged at its lower edge and which is provided at each end (see Figures 3 and 4) with a disc sector 153 to form side walls when the door is open. At each of its ends, the door is provided with a latch bar 154 which cooperates with a keeper 155 on the outer wall of the hopper. These latch bars normally hold the door in closed position as shown, and the latch bars may be lifted and the door swung to the position shown in broken lines in Figure 3. When in this open position, the door and the disc sectors 153 form a chute through which fur is delivered to the hopper.

Figure 7:
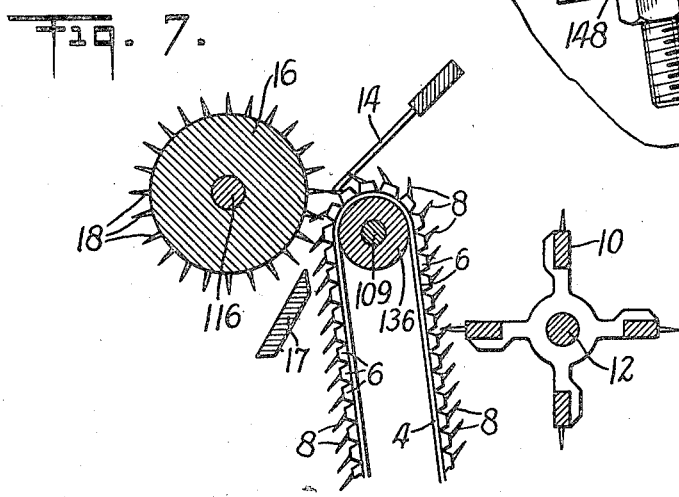
Figures 7 and 8 show a means for handling the fur as it is being removed from the supply hopper.
Figure 8:
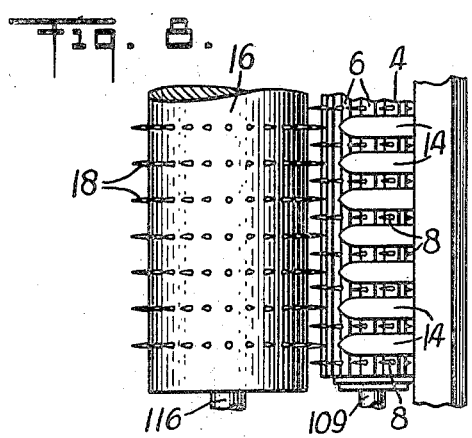

As indicated in my copending application, under some circumstances it is desirable to hold the fur to the apron as the fur is delivered from the apron to the front wiper. Accordingly, as shown in Figure 7, above and to the left of back wiper 10 and with their ends tensioned against apron 4 are resilient holding fingers 14. As shown in Figure 8, holding fingers 14 are of substantial width, and they are positioned to interfit with barbs 8 on apron 4, and thus tightly contact the layer of fur on the apron. Thus, as the layer of fur emerges from under the ends of the fingers, it is picked from the apron by the front wiper 16 and the individual hairs of the fur are thoroughly separated.

The electrical control circuit together with certain of the operating solenoids and certain portions of the air pressure system is shown in Figure 9. As pointed out above, this control circuit comprises a timed mechanism which cooperates with a number of mechanically operated switches to produce a unified control for the entire fur supply and bat-forming mechanism. This control correlates the action of: the means to move fur from the fur supply hopper to the weighing mechanism; the means to accurately weigh the fur into predetermined quantities; the means to separate the fur and convey it to the bat-forming tower; the means to move the perforated cones to and from the bat-forming tower where they have bats formed thereon; the suction and bat-wetting means associated with each of the perforated cones; and the cone flipper or inverting means for each of the cones. The control is such that the mechanism will continuously produce bats if it is permitted to operate without interruption, but the operator can stop the operation at any time, and when the mechanism is again started, no difficulty is encountered as a result of the stopping. This last feature of permitting the operator to stop the operation is important in providing a practical working machine.

As has been indicated above, in the present embodiment, two cones are alternately positioned within the forming tower, and, as fur is being deposited on one cone to form a bat, the bat upon the other cone is being wetted and stripped from the cone. Fur is supplied to these two cones in a single forming tower from a single weighing, conveying and fur separating unit.

Accordingly, the control mechanism, diagrammatically shown in Figure 9, causes the fur conveying and separating and fur weighing mechanisms to operate continuously to supply the fur to the forming tower in separate quantities each of which is sufficient to form a bat; and alternate ones of these quantities of fur are delivered to each of the cones. Thus, the sequence of operation for the weighing, conveying, and separating mechanism and for the forming tower mechanism is repeated for each bat which is formed.

However, while the same steps are performed by the mechanism individual to each of the cones, each cone is handled separately, and a complete cycle of operation for the mechanism associated with the cones is completed during the forming of two bats. Therefore, the control circuit is such that one portion of it completes a cycle of operation during a predetermined period of time while the other portion of the circuit completes its cycle of operation during two of these periods.

The apparatus is so controlled that a complete quantity of fur is being weighed and delivered to the conveyor during the time that a previously weighed quantity of fur is being deposited upon a cone. Provision is made for the operator to stop the automatic operation of any portion of the apparatus, and he can continue the manual control of the apparatus or he can make the automatic control operative again without danger of interfering with any of the steps of the operation.

Referring to the left-hand portion of Figure 9, the mechanism individually associated with each of the cones is controlled by a double gang-switch 320 having two identical sets or gangs of switches. The switches of each gang are mechanically interconnected so that they operate together, and they normally remain in the open-switch position. Each gang of switches is provided with a solenoid which is energized to close the switches of that gang. When one gang of switches is closed, circuits are completed controlling the suction upon the cone in the forming tower, the wetting and inverting of the cone outside of the tower, and the mechanism which moves the cones to and from the tower. When the other gang of switches is closed, similar circuits are completed which cause the same operations to be carried on.

In the present description, where the two cones are provided with separate but identical sets of operating mechanisms, the identical parts are given the same number, but the elements of one set have the suffix —1, and the elements of the other set have the suffix —2.

As shown in the lower right-hand portion of Figure 9, current is supplied to the control system from a three-phase, 220-volt, 60-cycle source having busses 326, 328 and 329. Busses 326 and 328 supply control current and, accordingly, are extended along the four sides of Figure 9, with the various control units connected thereto. At the right of the gang switch 320 bus 326 is connected to a downwardly extending lead 351 to which are connected various of the operating units designated by the suffix —2. The operating solenoids for the two sides of gang-switch 320 are designated as 330—1 and 330—2, respectively; one side of each solenoid is connected to a lead 332 which is in turn connected through a lead 334 to bus 328. The other side of solenoids 330—1 and 330—2 are connected, respectively, to terminals 336—1 and 336—2 of a switch 322; when armature 324 of switch 322 is in the position shown, terminal 336—1 is connected to a terminal 338—1 and when the armature is in the reversed position, terminal 336—2 is connected to a terminal 338—2. Terminals 338—1 and 338—2 are both connected through a lead 340 extending to the right and downwardly to a lead 342 which extends to the left to a terminal 344 of a switch 346. Armature 348 of switch 346 is normally in its lower position as shown, and when in this position, it connects terminal 344 to a terminal 349 which is connected through a lead 350 to bus 326. Thus with switches 346 and 322 positioned as shown, the potential of bus 326 is carried through lead 350, switch 346, leads 342 and 340, and switch 322 to solenoid 330—1.

In this manner, the full voltage between busses 326 and 328 is impressed across solenoid 330—1 and the armature 352—1 is held upwardly with the gang of switches at the left closed. The closing of switch 354—1 completes an interlock circuit from bus 326 through lead 356—1 and lead 358 to lead 340. Thus, as will be explained below, even though armature 348 of switch 346 is raised, solenoid 330—1 remains energized until armature 324 of switch 322 is reversed; armature 324 is mechanically connected to the cone-transfer rack and is reversed at the end of each movement of the rack. Thus, armature 324 remains in the position shown until the cones are moved to the reversed position; at this time, the switch is reversed with the result that solenoid 330—1 is deenergized and solenoid 330—2 is energized.

As pointed out above in connection with Figure 1, the cones are swung to and from the forming tower by alternately supplying air to the transfer cylinders. Air is supplied to one of the cylinders through an air line, and this supply of air is controlled by a normally closed valve (not shown). This valve is turned to its position to supply air to the air line by the energization of a control solenoid unit shown at the left of Figure 9 and designated 366—1. One side of unit 366—1 is connected directly to bus 328 by a lead 368—1. The other side of unit 366—1 is connected through a lead 364—1, a normally closed manual switch 362—1, a lead 361—1, and a switch 360—1 and through lead 370 to a terminal 372 of switch 346.

Switch 346 is provided with a swinging armature 373 which is normally in its lower position, the same as is armature 348, and these armatures are lifted to their upper position by the energization of a solenoid 371. Solenoid 371 has one side connected through a lead 369 to bus 328 and has its other side connected through lead 367, and a pair of door switches 365 and 363 to bus 326. Door switches 363 and 365 are normally open and they are positioned on the forming tower to be contacted and closed when both sets of the forming tower doors are fully opened. Accordingly, switch 363 is positioned to be engaged and closed by the left-hand door 201 (Figure 1) when the door reaches the extreme open position. Switch 365 is similarly positioned to be engaged by one of the doors on the other side of the forming tower. Thus, when both sets of doors are opened, both of switches 363 and 365 are closed and solenoid 371 is energized, thereby raising armatures 348 and 373.

Armature 373 is connected through a lead 375 to a terminal 377 of the suction timer switch 436, which, as will be more fully explained below, is provided with an armature which is raised a predetermined time after each cone-transfer operation. Armature 458 is connected through a lead 379 to a terminal 381 of a normally closed relay switch indicated at 383. Relay switch 383 is provided with two armatures 385 and 511 which are normally held raised by the energization of solenoid 773, one side of which is connected through a lead 775 to bus 328 and the other side of which is connected through a lead 777, manual switches 779 and 781, and lead 783 to bus 326. Thus, terminal 381 is normally connected through armature 385 directly to bus 326, and during operation, the raising of armature 373 of switch 346 connects bus 326 through armature 385, terminal 381, lead 379, armature 458, terminal 377, lead 375, armature 373, terminal 372, lead 370, switch 360—1, lead 361—1, switch 362—1 and lead 364—1 to solenoid unit 366—1. Thus when the bat has been removed from the cone outside the tower and a new bat has been formed on the cone inside the tower, the forming tower doors are opened, closing switches 363 and 365 and raising the armatures of switch 346, and the full line voltage between busses 326 and 328 is impressed across solenoid unit 366—1. This operates the air control valve so that air is supplied through the air line to the transfer cylinder and the cones are transferred in the manner outlined above.

Manual switch 779 is moved under some circumstances by the operator to the vertical position or to the right into engagement with terminal 795, and this opens the connection from lead 777 through switch 779 and switch 781 to lead 783. Accordingly, switch 346 is provided with a pair of interlock terminals 789 and 787 which are engaged by armature 348 when the armature is in the raised position. Terminal 789 is connected through a lead 791 to lead 777 and terminal 787 is connected through a lead 785 to switch 781. Thus, when the doors are opened, and the transfer operation has started, the circuit from bus 326 through switch 781 to lead 777 and solenoid 773 is not broken by the opening of switch 779.

The automatic control circuit for solenoid unit 366—1 may be disconnected by moving switch 362—1 to the center vertical position. The solenoid unit may then be energized by moving switch 362—1 to the left against contact 374—1 which is directly connected through a lead 376—1 to bus 326.

The control of the water to the spray is maintained by a valve control unit which opens the water valve when air is supplied through an air line. The supply of air to the air line is controlled by a spray solenoid unit 380—1 which when energized, opens the air valve, and when deenergized, closes the air valve and opens the air line to exhaust. One side of control unit 380—1 is connected through a lead 382—1 directly to bus 328; the other side of the control unit is connected through lead 384—1, switch 387—1, lead 389—1, switch 386—1, and lead 388 to terminal 390 of a spray timer switch generally indicated at 392.

With switch 392 in the position shown, its armature 394 contacts terminal 390 and connects it through lead 396 to terminal 398 of relay switch 383 which has its armature 385 connected to bus 326. When armature 385 is in its normally raised position, it engages terminal 398 and the potential of bus 326 is carried through armature 385, terminal 398, lead 396, armature 394, terminal 390, to lead 388, and when switch 386—1 is closed, to lead 389—1, and through switch 387—1 and lead 384—1 to the spray control unit 380—1. Thus, with the switches in the positions shown, the full potential between busses 326 and 328 is impressed across spray control unit 380—1 and water is supplied to the spray nozzle.

The spray timer switch 392 starts its timing operation when the doors are closed, and at the beginning of the timing operation, armature 394 is in the position shown. When the timing operation is completed, the armature is lifted and the armature is held in this raised position until the next cone-transfer operation takes place. At this time, the armature is immediately dropped so that the timer switch may be immediately recycled to start a new timing operation. The timer switch is provided with a cyclic operation mechanism 410 which has one side connected through a lead 416 to bus 328 and which has its other side connected through a lead 415 to lead 340, which as outlined above, is connected to terminal 344 of switch 346, and when the doors are closed terminal 344 is connected through armature 348, terminal 349 and lead 350 to bus 326. The connection between lead 415 and bus 326 is maintained after the doors are reopened through lead 340 which is connected through an interlock circuit formed by lead 358, switch 354—1 and lead 356—1 to bus 326. This interlock is maintained until the transfer operation which reverses armature 324 to thereby deenergize solenoid 330—1, with the result that the gang of switches 352—1 is dropped. Shortly thereafter, the doors are reclosed, with the result that armature 348 of switch 346 is dropped to again connect lead 342 to bus 326 and again energize the operating mechanism 410. Thus, the operating mechanism is deenergized at the end of each transfer operation and is again energized or recycled when the doors are closed.

This operating mechanism is so adjusted that after energization, armature 394 remains in the position shown for a period such, for example, as six seconds, and at the end of this period, the armature is lifted to its raised position away from terminal 390. Thus, after a cone has been removed from the forming tower with a bat thereon, the reclosing of the doors permits armature 348 to drop with the result that one gang of switches of gang-switch 320 is closed, thereby starting the spraying operation, and simultaneously the cycle of the spray timer switch is started. This spraying operation continues for the period, illustratively, six seconds, at the end of which time, armature 394 is lifted, breaking the circuit of solenoid 380—1.

When a bat is removed from the forming tower, it is sprayed, and during the early part of this spraying process, it is important that sufficient suction be maintained upon the inside of the cone to draw the water through the bat so that the bat is thoroughly wetted. During the latter period of the spraying process, the suction is reduced so that the water will not be drawn into the suction blower, and so that the bat will be left in a properly wetted condition.

The suction in each of the suction pipes is controlled by a butterfly valve which is opened by supplying air to a control unit through an air line. The supply of air to the two air lines is controlled by two suction-control units 420—1 and 420—2 which are controlled by the combined operation of the lower switch of each gang of switch 320, and the suction timer switch 438 which in turn controls a switch 422. One side of suction-control unit 420—1 is connected to bus 328 through a lead 424, and one side of unit 420—2 is connected to bus 328 through lead 334. The other side of suction-control unit 420—1 is connected through a lead 442—1 to switch 444—2 and in a like manner, the other side of suction control unit 420—2 is connected through a lead 442—2 to switch 444—1.

Switches 444—1 and 444—2 are connected through a lead 446 to bus 326 and thus, when the left-hand gang of switch 320 is closed, the right-hand suction-control unit 420—2 is held energized and suction is continually maintained upon the right-hand cone which is then within the forming tower. Similarly, when the right-hand gang of switch 320 is closed, the left-hand suction-control unit 420—1 is held energized. However, suction upon the cone outside the forming tower is controlled by the switch 422. Accordingly, lead 442—1 is connected through a lead 441—1 and a switch unit 428—1 of switch 422 to bus 326, and in a like manner, lead 442—2 is connected through a lead 441—2 and a switch unit 428—2 to bus 326. Thus, when the armature 434 of switch 422 is in the lower position shown, both suction units are connected to bus 326 regardless of the closing of the two gangs of switches of switch 320, and when the armature 434 of switch 422 is raised, suction is maintained only on the cone within the forming tower.

Armature 434 of switch 422 is raised by the energization of solenoid 436 which has one side connected to bus 328 through a lead 448 and which has its other side connected through a lead 450 to terminal 451 of switch 346 which is normally engaged by armature 373. As indicated above, armature 373 is connected through lead 375 to terminal 377 of the suction timer switch 438 and when the armature 458 of the suction timer switch is raised, a connection is made through lead 379 and relay switch 383 to bus 326. Suction timer switch 438 is provided with a cycling operating mechanism 462 which is similar to and is connected in parallel with the corresponding operating mechanism 410 of spray timer switch 392, and thus, the suction timer switch starts its timing cycle simultaneously with the starting of the timing cycle of the spray timer switch. The operating mechanism lifts armature 458 four seconds after the beginning of its timing cycle and at the end of this time, bus 326 is connected through relay switch 383, lead 379, armature 458, terminal 377, lead 375, armature 373, terminal 451, and lead 450 to solenoid 436. This energizes solenoid 436 and lifts armature 434, and due to the fact that switch 444—2 is open, suction-control unit 420—1 is deenergized. This reduces the suction on the cone which is being sprayed and the remainder of the spraying operation is carried on with reduced suction. Later, when the bat has been removed from the cone, and the doors are reopened so that the cones can be transferred, the armature 373 of switch 346 is raised in the manner explained above, so that the circuit of solenoid 436 is broken and armature 434 falls immediately to again energize the suction control unit 420—1. In this manner, the suction within the cone is permitted to build up during the time that the cone is being moved into the forming tower and when the doors are reclosed, there is sufficient suction on the cone to immediately draw the falling fur to the cone.

It will thus be seen that the closing of one of the gangs of switch 320 provides suction upon the cone during the entire time that the cone is in the forming tower and that prior to the opening of this gang of switches, an interlock is formed through switch 422 which maintains suction for a predetermined period of time. This predetermined period of time is regulated by adjusting the suction timer switch 438 which is energized at the time the spraying operation is started. Thus, accurate and reliable control is maintained upon the suction at all times and the apparatus is readily adaptable for efficient operation under a wide variety of conditions.

Under some circumstances, it is desirable to hold the suction from the cone while the cone is being moved into the forming tower. That is, for example, there are times when the suction builds up rapidly enough to cause a draft of air which is sufficient to dry the cone as the cone is being moved to the forming tower, and when fur is deposited onto a dry cone, the fur tends to form "rolls." Accordingly, in this embodiment, lead 450 is connected to lead 375 by a manual switch 793, and when this manual switch is closed, it bypasses the circuit from lead 375 through armature 373 and terminal 451. Thus, when the doors are open and armature 373 is raised, the circuit of solenoid 436 is not broken and the solenoid remains energized. In this manner, armature 434 is held in the raised position and suction is not returned to the cone. At the end of the transfer operation, the suction timer switch 438 is recycled and its armature 458 is dropped. This opens the circuit of solenoid 436 and the suction is immediately returned to the cone.

After the spraying operation has been completed, the cone is automatically inverted so that the bat may be stripped therefrom. This inverting operation is accomplished by supplying air to a vertical cylinder through an air line the construction of which is explained in my copending application. The supply of air to this air line is controlled by a flipper solenoid unit 468—1 having one side connected through a lead 470—1 to bus 328, and the other side connected through a lead 472—1, a manual switch 474—1 and a lead 476—1 to a switch 478—1 of the gang 352—1. The other side of switch 478—1 is connected through a lead 480 extending to the right to a terminal 482 of a solenoid switch 484.

Solenoid switch 484 is provided with an armature 486 which is connected to a lead 501 and which is moved to its upper position into engagement with terminal 482 by the energization of solenoid 485 which has one side connected to bus 328 through a lead 498. The other side of solenoid 485 is connected by leads 500 and 501 to a terminal 492 of a switch 393 which is provided with two armatures 395 and 397, and these armatures are lifted upon the energization of a solenoid 400. Solenoid 400 has one side connected through lead 498 to bus 328 and has its other side connected through a downwardly extending lead 502 to the lower terminal 504 of the suction timer switch 438. The armature 458 engages terminal 504 at the beginning of each timing cycle, and during this time, the terminal 504 is connected through armature 458, lead 379 and relay switch 383 to bus 326. Thus, during the initial period of each of the timing cycles of the suction timer switch, solenoid 400 is connected through the suction timer switch to bus 326 and the armatures of switch 393 are raised. When in the raised position, armature 395 bridges a pair of interlock terminals 401 and 403 and thereby connects lead 502 to lead 512. Lead 512 is connected through a pair of normally closed pressure switches 508—1 and 508—2 to a lead 510 which extends to the left where it is connected through switch unit 511 of relay switch 383 to bus 326. Thus, when armature 395 is raised at the beginning of a cycle of operations by the dropping of armature 458, an interlock circuit is formed through terminal 401, armature 395, terminal 403, and thus through lead 512, the pressure switches 508—1 and 508—2, lead 510 and switch unit 511 to bus 326. Therefore, when the suction timing operation is completed and armature 458 is raised, solenoid 400 remains energized as long as the interlock circuit is not interrupted.

When in the raised position, armature 397 connects lead 501 through terminal 492 to terminal 493 which is connected through a lead 495 to terminal 497 of the spray timer switch 392. As explained above, when the spraying operation is completed, armature 394 of the spray timer switch is raised, and when in the raised position, armature 394 connects terminal 497 to lead 396 and thus through relay switch 383 to bus 326. In this manner, at the end of the spraying operation, bus 326 is connected through switch 383, lead 396, timer switch 392, lead 495, switch 393, leads 501 and 500 to solenoid 485 with the result that solenoid 485 is energized. The energization of solenoid 485 raises armature 486 and completes the connection from lead 501 through switch 484, lead 480, switch 478—1, lead 476—1, switch 474—1 and lead 472—1 to the flipper unit 468—1. The energization of unit 468—1 causes air to be delivered to the air cylinder of the flipper mechanism and the cone is moved to its inverted position at the flipper station.

Pressure switch 508—1 is connected to the air cylinder of the flipper mechanism which has its air supply controlled by the left-hand flipper control unit 468—1, and similarly, pressure switch 508—2 is connected to the air cylinder of the right-hand flipper mechanism, all in a manner pointed out in my copending application. When the flipper operation is being carried on, the pressure in the cylinder does not rise to the full air line pressure, but when the mechanism reaches the limit of its movement, the air pressure gradually rises and during this time, the operator removes the bat from the cone. Pressure switches 508—1 and 508—2 are so adjusted that they normally remain closed, but each of them opens when the pressure in its air line reaches the value of seventy pounds per square inch. Thus, after the cone has been moved to the stripping position and the pressure within the cylinder reaches seventy pounds per square inch, switch 508—1 snaps to the open position, and this breaks the interlock circuit to solenoid 400. Accordingly, the solenoid is deenergized and the armatures 397 and 395 drop.

The dropping of armature 397 opens the circuit to the flipper control unit 468—1 and this shuts off the air to the flipper-operating mechanism. The flipper operating mechanism automatically moves by gravity back to its lower position returning the cone to its position at the side of the forming tower, and pressure switch 508—1 closes when the pressure within the cylinder reaches substantially atmospheric pressure. Thus, the interlock circuit is conditioned so that during the next cycle of operations it will be effective to maintain solenoid 409 energized.

When the operator is removing the bat from the cone and, for some reason, he desires to hold the cone in the inverted position for an extended period of time, he merely swings the armature of switch 779 against its right-hand terminal 795. This carries the potential from bus 326 through lead 783, switch 781, switch 779, and a lead 797 to lead 480. Thus, even though the pressure switch is opened to thereby open switch 393 and break the normal flipper circuit, the flipper control unit remains energized. The cone may be returned at any time by moving the armature of switch 779 to the position shown. The cone may also be held in the raised position, or it may be moved to the raised position, by moving the armature of switch 474—1 to the left into contact with terminal 473—1. This connects solenoid unit 468—1 directly to bus 326 through lead 475—1, and maintains air pressure in the flipper cylinder regardless of the condition of the remainder of the circuit.

As has been pointed out above, fur is delivered to the weighing mechanism at a rapid rate during the delivery of the major portion of each quantity of fur to form a bat. However, as the amount of fur in the scale hopper approaches the proper weight, the rate of delivery of fur is slowed down and accurate and dependable weighing is accomplished. In the embodiment disclosed, the slowing down of the rate of delivery of fur is accomplished by moving the back wiper toward the apron and the apron is slowed down, and as a result, a thinner layer of fur is moved to the front wiper at a slower rate. The accuracy of weighing is further facilitated by reducing the speed of rotation of the front wiper to thereby render negligible the effect upon the scale of the blast of air from the front wiper. Thus, the fur from the front wiper slowly settles into the hopper, and the scale arm approaches the balanced condition. The fur has negligible momentum, and when the force of the blast of air is negligible, the possibility of an error in weighing is very small.

The back wiper is moved toward the apron in the manner outlined above in connection with Figure 3 by the energization of a solenoid unit 72 which, as shown at the right of Figure 9, has one side connected through a lead 760 to bus 328 and which has its other side connected through a normally open switch unit 762 and a lead 764 to bus 326. Switch unit 762 is a part of solenoid switch 766 and switch 766 is provided with a solenoid 768 which has one side connected through a lead 770 to bus 328. The other side of solenoid 768 is connected through a lead 772 to a magnetically operated sealed switch 774 the other side of which is connected through a lead 564, a switch unit 575 and a lead 579 to bus 326. Switch unit 575 remains closed when fur is being delivered to the hopper, and as the amount of fur within the hopper approaches the desired quantity, the initial movement of the scale arm moves the magnetic armature of switch 774 to thereby close switch 774 and connect solenoid 768 to bus 328. This closes switch 762 and energizes solenoid unit 72, with the result that the back wiper is moved to its position near the apron.

As indicated above, the change in the rate of movement of the apron and the rate of rotation of the front wiper is accomplished by changing the drive from a fast speed motor 92 to a slow speed motor 94. These motors are shown at the right of Figure 9 with motor 92 connected to bus 328 by a lead 540 and motor 94 connected to bus 328 by a lead 542. A solenoid switch 544 controls the connecting of the two motors to the other two busses, and switch 544 is provided with two armatures 553 and 554 and with a solenoid 556. When solenoid 556 is deenergized, armatures 553 and 554 engage terminals 551 and 552, respectively, which are connected through leads to the proper terminals of motor 92. Armature 554 is connected through a lead 570 to a normally closed switch unit 576 of a solenoid switch 574, and in a like manner, armature 553 is connected through a lead 569 to a normally closed switch unit 575 of solenoid switch 574. The other side of switch 576 is connected through a lead 580 to bus 329, and the other side of switch 575 is connected through a lead 579 to bus 326.

In this way, when the switch units 575 and 576 are in their normal closed positions, buses 326 and 329 are connected to switch 544, and when the armatures of switch 544 are positioned as shown, motor 92 is operated. Later, when solenoid 556 is energized, the armatures are raised and motor 94 is operated. Solenoid 556 of switch 544 is connected at one side through a lead 538 to bus 328, and at the other side through a lead 560 to a magnetically operated sealed switch 562. The other side of switch 562 is connected to lead 564 which, as indicated above, is connected through switch unit 575, and lead 579 to bus 326. As previously pointed out, the initial movement of the scale arm toward the balanced position closes switch 774 and this moves the back wiper toward the apron. Upon continued movement of the scale arm, the magnet of switch 562 is moved to close switch 562, and this energizes solenoid 556 which raises the armatures 553 and 554 and changes the drive from motor 92 to motor 94.

As indicated above, motors 92 and 94 drive the apron and the front wiper, and the front wiper picks the fur from the apron so that the individual hairs fall down to the scale hopper. Switches 562 and 774 and their operating magnets are so related that the change in the front wiper and apron drive from fast speed to slow speed takes place approximately one and one-half seconds after the back wiper has been moved toward the apron. Thus, at the time of the reduction in speed of the front wiper, the thicker layer of fur has been picked from the apron and the thin layer of fur is then presented to the front wiper. The layer of fur of reduced thickness is thoroughly separated by the front wiper and this is carried on until the amount of fur in the scale hopper reaches the exact weight.

As explained above in connection with Figure 1, when the quantity of fur in the hopper reaches the desired weight, a bracket 964 on the scale arm 21 intercepts a beam of light from spotlight 962, and the photo-electric relay unit 19 is thereby rendered effective. Referring to Figure 9, photo-electric relay unit 19 has one side connected to bus 326, and has its other side connected through a lead 804 to solenoid 590 of switch 574. The other side of solenoid 590 is connected through a lead 802 to bus 328, and the closing of the photo-electric relay 19 energizes solenoid 590 and raises the armatures of switch 574. As a result, switch units 575 and 576 are opened to thereby break the circuits of the motors 92 and 94. As explained above, at this time in the feeding operation, solenoid 556 of switch 544 is energized and the apron and the front wiper are being driven by the slow speed motor 94, and when switch units 575 and 576 are opened, this feeding operation is immediately stopped. The opening of switch unit 575 opens the circuits through lead 564 to switches 562 and 774, so that solenoids 556 and 768 of switches 544 and 766, respectively, are deenergized. Thus, switch 544 is conditioned to deliver power to the fast speed motor 92 when the feeding operation is restarted, and the back wiper 10 is moved away from apron 4.

As explained above in connection with Figure 3, to insure that the feeding operation will stop immediately when motor 94 is disconnected, an automatically operating brake unit 95 is provided upon the shaft of motor 94. Brake unit 95 is schematically shown as having a brake drum 966 upon the motor shaft which is gripped by a pair of brake shoes 968 with the shoes pressed against the brake drum by a pair of springs (not shown). A cam lever 970 is provided with a cam portion extending between the ends of the brake shoes, and when the cam lever is moved down, the cam portion moves the brake shoes away from the brake drum. Attached to the left-hand end of cam lever 970 is an operating armature 972 which is pulled down to release the brake by the energization of a solenoid 974. One side of solenoid 974 is connected by a lead 976 to lead 570 and the other side is connected through a lead 978 to lead 569. As explained above, both motors derive power for their operation through leads 570 and 569 which connect switches 576 and 575, respectively, to armatures 554 and 553 of switch 544. The feeding operation is stopped by the opening of switches 576 and 575 to thereby disconnect leads 570 and 569 from their busses; the feeding operation is restarted by the closing of switches 576 and 575. Thus, whenever either of motors 92 or 94 is to operate, line potential is across leads 570 and 569 and this energizes solenoid 974 to release the brake unit 95. When both of the motors are turned off solenoid 974 is deenergized and the brake is engaged to immediately stop the motors and prevent coasting movement of apron 4 and front wiper 16.

The lifting of the armatures of switch 574 also closes a switch unit 806 which has one side connected through lead 579 to bus 326, and which has its other side connected through a lead 810 to a baffle-operating unit 812, the other side of which is connected through lead 814 to bus 328. Baffle-operating unit 812 is effective when energized to raise baffle 26 (Figure 1) to the broken-line position. Thus, simultaneously with the stopping of the feeding operation, baffle 26 is raised to immediately "cut off" the supply of fur to the scale hopper. The raising of the armatures of switch 574 also closes a switch unit 816 which is connected through a lead 652 to a scale-opening solenoid unit 646, the other side of which is connected through a normally closed manual switch 650 to bus 328. At the left, switch unit 816 is connected through a lead 656 and an upwardly extending lead 818 to a switch unit 640 of the cyclic timing mechanism indicated at 609.

This cyclic timing mechanism normally completes a cycle while one quantity of fur is being weighed and another quantity of fur is being deposited upon a cone. At the left, a constant-speed motor 610 is connected through a speed reduction mechanism to a shaft 612 carrying six cams. Each of these cams is positioned to engage and close a normally open switch for a predetermined period of time, at a particular point in the cycle of operation; the cams are designated 622, 624, 626, 628, 630, and 632, and they operate switches 634, 638, 636, 640, 642, and 644 respectively.

At the left of the motor 610 upon a shaft 615 is mounted a brake 614 which prevents rotation of the motor except when the brake solenoid 616 is energized. Solenoid 616 is connected across the input leads 618 and 620 of motor 610 and is energized to release the brake when the motor is started. Shaft 612 rotates at the rate of one revolution every twenty-seven seconds, and the various switches are opened and closed by their respective cams for varying portions of this time, to complete a cycle in a manner more fully pointed out below. It should be noted, however, that the period of time necessary to complete the steps which occur during one cycle depends upon the conditions under which the apparatus is used, and particularly upon the time necessary to deposit a single quantity of fur on a cone in the forming tower, and the length of time necessary to weigh a quantity of fur. Accordingly, the rate of rotation of shaft 612 and the contours of the various cams are varied depending upon the conditions of use.

Under normal conditions of operation, immediately after the proper quantity of fur has been delivered to the hopper, as indicated by the closing of switch unit 816, cam 628 engages and closes switch 640 to thereby complete a circuit to bus 326 from lead 818 through lead 658, terminal 820 of a relay switch 822, a normally raised armature 824 of the switch, and a lead 826 to bus 326. This carries the potential of bus 326 through lead 826, switch 822, lead 658, switch 640, lead 818, switch unit 816, and lead 652 to solenoid 646, and the other side of the solenoid is connected through switch 650 to bus 328. This energizes solenoid unit 646 to thereby open the bottom-dumping mechanism of the scale hopper and dump the fur.

After the bottom-dumping mechanism of the hopper has been opened, and the fur falls on endless belt 24, the bottom of the hopper is closed again by the energization of scale-closing solenoid unit 682. One side of solenoid unit 682 is connected through lead 648 and switch 650 to bus 328, and the other side is connected through lead 684, switch 642 and lead 686 to lead 658, and thus through relay switch 822 and lead 826 to bus 326. Accordingly, during normal operation, at an interval of three seconds after the closing of switch 640, cam 630 engages and momentarily closes switch 642 to thereby close the bottom-dumping mechanism so that the scale hopper may receive fur again.

After the proper quantity of fur has been delivered to the hopper, thereby closing photo-electric relay 19 and energizing solenoid 590 of switch 574, the photo-electric relay is apt to reopen due to the swinging of the scale arm 21, as when the fur falls from the hopper, before the closing of the bottom-dumping mechanism. However, it is important that baffle 26 be held in its raised position (the broken-line position of Figure 1) to deflect fur from the top of the hopper, and that the feeding mechanism remain stationary until the bottom-dumping mechanism is closed so that the hopper may receive fur. Otherwise, the restarting of the feeding operation would result in the delivery of fur through the hopper without being weighed. Accordingly, simultaneously with the closing of switch 640 by cam 628, switch 644 is closed by cam 632 to complete an interlock circuit around the photo-electric relay unit 19, and this interlock circuit maintains solenoid 590 energized even though the circuit of the relay unit 19 is opened. This interlock circuit extends from bus 326 through lead 826, armature 824, terminal 820, lead 658, switch 640, lead 818, lead 656, switch unit 816, lead 652, switch 644 and lead 680 to solenoid 590. This interlock circuit is held until cams 628 and 632 simultaneously move away from their switches 640 and 644, which is at the time of the closing of the hopper by the solenoid unit 682.

After the dumping operation, the scale hopper contains no fur and therefore, the hopper 20 is immediately raised so that the scale arm 21 moves downwardly, and the beam of light from spotlight 962 again plays upon the photo-electric cell so that photo-electric relay unit 19 disconnects lead 804 from bus 326. Thus solenoid 590 is deenergized and the armatures of switch 574 are dropped. This opens switch unit 806 and deenergizes the solenoid unit 812 so that baffle 26 is returned to its vertical position. Switch units 575 and 576 are also reclosed so that the power circuits for motors 92 and 94 are extended to switch 544. The return of the scale arm also opens switches 562 and 774 and solenoids 556 and 768 remain deenergized with the armatures of switches 544 and 766 in the position shown. Thus the control circuit for supplying fur to the scale hopper is conditioned to feed fur to the scale hopper at a rapid rate.

As pointed out above, sieve-rollers 38 and 40 are stopped just prior to the opening of the forming tower doors and a layer of fur is accumulated upon each of the rollers. When a new cone has been placed in the forming tower, the sieve-rollers are started again at a time such that when the doors are completely closed, the accumulated fur is immediately deposited upon the cone. The sieve-rollers are driven by a clutch which is normally held engaged by a spring and a solenoid unit 690 is provided which is energized to disengage the clutch and stop the sieve-rollers. Solenoid unit 690 has one side connected through a lead 692 to bus 328, and has its other side connected through a lead 698 to a normally closed switch unit 828 of a relay switch 900. The other side of switch unit 828 is connected through leads 902 and 904 to switch 638, the other side of which is connected to a lead 700 which extends downwardly and to the left where it is connected through a lead 702 to a terminal 704 of switch 346. Terminal 704 is positioned to be contacted by armature 373 when the armature is in the lower position as shown, and as pointed out above, at the end of the suction timing cycle, armature 373 is connected through lead 375, terminal 377 of the suction timer switch 438, armature 458, lead 379, and switch 383 to bus 326. Accordingly, just prior to the opening of the forming tower doors, cam 624 closes switch 638 and energizes solenoid unit 690 to stop rotation of the sieve-rollers. Later, when the forming tower doors are completely open, armature 373 of switch 346 is raised, thereby breaking this circuit to solenoid unit 690 and restarting the sieve-rollers. The cone-transfer operation is then carried on and the timing is such that the forming tower doors are reclosed by the time the fur moves from the sieve-rollers to the cone.

Relay switch 900 is provided with a normally deenergized solenoid 752 and an armature 742 which is normally in its lower position to thereby close the switch units 744 and 828. Switch unit 744 is in the circuit of the cyclic motor 610 with one side connected through lead 748 to input lead 618 of the cyclic motor, and with the other side connected through a lead 746 to a terminal 747 and an armature 908 of a relay switch 906, and through lead 826 to bus 326.

Relay switch 906 is provided with a normally deenergized solenoid 910, and its armatures 908 and 912 remain positioned as shown except when the solenoid is energized. Armature 912 normally bridges a pair of contacts, one of which is connected at the left through lead 694 to bus 328, and the other of which is connected through leads 914 and 916 to a terminal of motor 730 for driving the endless belt 24 (Figure 1) and the adjacent feed rollers 30. The right-hand terminal of motor 730 is connected through lead 922 to bus 329, and the left-hand terminal is connected through lead 920, terminal 918, armature 908, and lead 826 to bus 326. Thus motor 730 is connected to all three of the busses, and runs continually under normal conditions.

Solenoids 752 of relay switch 900 has one side connected through a lead 694 to bus 328, and its other side connected through leads 696 and 697 to a normally open switch unit 584 of switch 766. The other side of switch unit 584 is connected through lead 818 to switch 640 which, as pointed out above, has its other side connected through lead 658, switch 822, and lead 826 to bus 326. Under normal conditions, at the end of the cycle of weighing of a quantity of fur, cam 628 closes switch 640 to operate the bottom-dumping mechanism of the hopper, whereupon, the fur falls from the hopper and the bottom-dumping mechanism is reclosed.

However, near the end of the feeding cycle, the armatures of switch 766 are raised, and they remain in this raised position until the full weight of fur has been delivered to the hopper to thereby operate the photo-electric relay unit 19 and raise the armatures of switch 574. Accordingly, if the full weight of fur has not been delivered to the hopper at the time switch 640 is closed, the potential of bus 326 is carried through lead 826, switch 822, lead 658, switch 640, lead 818, switch unit 584, lead 697, and lead 696 to solenoid 752. This energizes solenoid 752 and the armature 742 of switch 900 is raised. The raising of armature 742 opens switch unit 744 to thereby stop the cyclic motor 610.

Solenoid 910 of relay switch 906 has one side connected through lead 694 to bus 328 and has the other side connected through a lead 754 to switch 636, the other side of which is connected through a lead 756 to lead 700. As explained above, in connection with stopping the rotation of the sieve-rollers, lead 700 is connected through lead 702 to terminal 704 of switch 346, and during the period of time after the completion of the suction timing cycle and before the opening of the doors, terminal 704 is connected through armature 373, lead 375, terminal 377 of suction timer switch 438, armature 458, lead 379, and switch

383 to bus 326. Cam 626 is so positioned that under normal conditions, it momentarily closes switch 636 shortly after the opening of the doors. The opening of the doors having lifted armature 373, the closing of switch 636 does not complete the circuit to solenoid 910. However, if there has been a delay in the spraying and removing of the bat from the cone, this delay will result in the forming tower doors remaining closed. Thus, at the time cam 626 closes switch 636, if armature 373 has not been lifted a circuit is completed to energize solenoid 910. This lifts armature 908 and stops the cyclic motor 610, and the operations of the fur feeding mechanism are temporarily stopped. Subsequently, when the operations at the forming tower have been completed, the doors automatically open so that armature 373 is lifted, thereby deenergizing solenoid 910 and restarting the cyclic motor.

Switch 822 is provided with a normally energized solenoid 666 which has one side connected through a lead 668 to bus 328, and which has its other side connected through a lead 672, a manual switch 674, and lead 826 to bus 326. Manual switch 674 is normally in the left-hand position as shown, so that solenoid 666 is energized and the switch armatures 824 and 825 are raised. When the armature of manual switch 674 is moved to the vertical position, solenoid 666 is deenergized, thereby dropping the armatures 824 and 825. In dropping, armature 824 engages a terminal 926 which is connected through lead 754 to solenoid 910 of relay switch 906. This raises armature 908 and stops the cyclic timer motor 610 in the manner outlined above, and it also disconnects the feeder motor 730 so that apron 24 is stopped. Armature 824 also engages a terminal 928 which is connected through a lead 930, lead 902, switch unit 828, and lead 698 to solenoid unit 690 with the result that the sieve-rollers are stopped. The dropping of armature 825 bridges two contacts to connect bus 326 through lead 826 to a lead 932 which is connected through lead 680 to the solenoid 590 of relay switch 574. This energizes the solenoid 590 and lifts the armatures of switch 574 to thereby shut off the fur weighing and moving operations.

When it is desirable to clean the fur weighing and conveying mechanism manual switch 674 is swung to the right into engagement with terminal 934 which is connected through a lead 936, and lead 696 to solenoid 752 of switch 900. This opens switch unit 828 to thereby deenergize solenoid unit 690 and restart the sieve-rollers. The armature of switch unit 828 also bridges a pair of contacts 938 and 940 which connects bus 326 through a lead 942, terminal 940, the armature, terminal 938, a lead 944, and lead 920 to motor 730. The armature of switch unit 744 is lifted to bridge a pair of contacts which connect lead 692 to a lead 946. As explained above, lead 692 is connected to bus 328, and lead 946 is connected through lead 916 to the center terminal of motor 730. Thus, the raising of armature 742 restarts the apron 24, the feed-rollers, and the sieve-rollers, and the apparatus may be cleaned as by a blast of air.

As indicated above, the forming tower doors are opened at the proper time in the cycle of operations so that the one cone may be moved from the forming tower, and the other one may be moved into the forming tower. This occurs after the bat has been removed from the cone outside the forming tower, and fur has been deposited upon the cone within the forming tower. The doors are opened by the energization of a solenoid unit shown in the center portion of Figure 9 and indicated at 710. One side of solenoid unit 710 is connected through a lead 416 to bus 328, and the other side is connected through a lead 716 to switch 634, with the other side of the switch connected through a lead 728 to a terminal 727 of switch 393.

When the armature 395 of switch 393 is in the lower position, terminal 727 is connected to a terminal 729 which is connected through lead 512, the normally closed pressure switches 508—1 and 508—2, lead 510, and switch unit 611 to bus 326. During normal operation, cam 622 closes switch 634 to thereby energize the solenoid unit 710 and open the doors. However, if there has been a delay in the flipping operation, so that the flipper mechanism has not returned the cone to the side of the forming tower, the corresponding one of pressure switches 508—1 or 508—2 remains open, and the doors cannot be opened. Under these circumstances, the return of the cone and the closing of the pressure switch immediately closes the circuit and the doors are opened.

As explained above in connection with the bat-spraying operation, when a cone with a bat thereon is moved from the forming tower, solenoid 400 of switch 393 is energized through the suction timer switch, with the result that the armatures of switch 393 are raised. An interlock circuit is then formed which is broken only when the flipper has moved the cone to the bat-stripping position, the interlock circuit being broken by the opening of the one of the pressure switches 508—1 or 508—2. The lifting of armature 395 of switch 393 opens the circuit between leads 728 and 512 of the door-opening circuit, and, at the time armature 395 is dropped again, the door opening circuit is broken by the opening of one of the pressure switches.

In this manner, when a cone with a bat thereon is moved from the forming tower and the doors are reclosed, the cycle of operations is started which includes the steps of spraying the bat and moving the cone to and from the bat-stripping station; due to the forming of the interlock, these steps are performed automatically in their proper order. If there is a delay in one of the steps, the starting of each of the other steps is automatically delayed. Furthermore, if this group of steps takes longer than the normal time allotted to them, the operation of the machine automatically compensates for the delay.

It is important that certain of the individual operations of the mechanism be carried to completion if they are once started, and the present apparatus insures that this will be done. For example, if the apparatus were stopped in the middle of the transfer operation, it would be difficult to restart the apparatus without danger of injuring the apparatus. Further, if the weighing operation is started, it should be completed before the apparatus is stopped. As indicated above, the opening of the doors initiates the transfer operation and the doors are held open until the transfer operation is completed. The opening of the doors raises the armatures of switch 346 to complete the cone transfer circuit through armature 373 and terminal 372, and simultaneously armature 348 bridges terminals 789 and 787 to form an interlock circuit between lead 777 and switch 781. This interlock circuit is effective to hold solenoid 773 energized, even though the armature of switch 779 is swung to the right, away from its terminal. Thus the circuits of switch 383 are maintained until the transfer operation is completed and the doors are reclosed.

The operator may stop the operation of the apparatus by swinging manual switch 779 to the right, and thus disconnect solenoid 773 of switch 383 to permit the armatures of the switch to drop. This breaks the suction timer switch circuit as well as the spray timer switch circuit as armature 385 falls away from contacts 381 and 398. The door-operating circuit is also broken due to the opening of switch unit 511. In dropping, armature 385 engages terminal 950 which is connected to lead 700 to thereby carry the potential of bus 326 along lead 700 to switches 638 and 636. In this way, when cam 624 closes switch 638, the sieve-rollers are immediately stopped, regardless of the opening of the forming tower doors. Later, when cam 626 closes switch 636, solenoid 910 is energized to lift armatures 908 and 912 so that the cyclic timing motor 610 is stopped and motor 730 is stopped.

In this way, the entire apparatus is conditioned for further use and can be restarted without delay. Furthermore, this control mechanism is effective to compensate the operation of one portion of the apparatus for delays which occur in the operations of other portions of the apparatus.

When it is desirable to open the doors independently of the operation of the remainder of the apparatus, as for example for sweeping out, the armature of manual switch 781 is swung to the right to connect lead 783 through a lead 711 to solenoid unit 710. This carries the potential of bus 326 to the solenoid unit and opens the doors. This opens the circuit of switch 779 and stops the operation of the apparatus as outlined in connection with the discussion of switch 779.

It will thus be seen that I have provided a practical and efficient system and apparatus for accomplishing the several objects hereinabove mentioned, as well as many others, in a successful manner.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In the art of forming hats by means of an apparatus which delivers fur in predetermined quantities to a bat former where it is deposited upon cones in the form of bats, the steps of, controlling the means for delivering fur to the bat former by a master cyclic means, controlling the delivery of fur to the apparatus which divides the fur into predetermined quantities by decreasing the rate of supply of the fur as the particular quantity of fur approaches the desired quantity, controlling the mechanism which handles the cones so that a bat is formed on the cones and is then wetted preventing the starting of a new cycle of operation by said master cyclic means if the cone which is to receive the next bat has not had the previous bat presented for removal therefrom, and delaying the continuance of the cycle of operation to permit the continued delivery of fur to the apparatus in the event that the amount of fur in the particular quantity has not reached a predetermined value at the time in the cycle when the delivery of fur is normally interrupted.

2. In hat-making apparatus of the type wherein fur is divided into predetermined quantities and each quantity is deposited upon a cone to form a bat, the combination of: fur-receiving means to receive a predetermined quantity of fur and including means to dump each predetermined quantity of fur for delivery to a cone; fur-feeding means to deliver fur to said fur-receiving means; and control means for the apparatus including, trip means which is actuated by the delivery of said predetermined quantity of fur to said fur-receiving means, means responsive to the actuation of said trip means to stop the delivery of fur to said fur-receiving means and to condition the apparatus for the dumping of said fur-receiving means, a cyclic timing mechanism to exert supervisory control upon the operations of the apparatus and at a predetermined time in each timing cycle to initiate the dumping of said fur-receiving means, and an interlock means which is effective to stop the timing operation of said cyclic timing mechanism if said cyclic timing mechanism reaches the point in its timing cycle where it is to initiate the dumping operation before the actuation of said trip means.

3. In a bat former wherein fur is deposited in predetermined quantities upon cones in a forming tower which is provided with door means wherein a cone assembly is provided which includes a cone normally positioned upon a cone-supporting structure and adapted to receive fur while in the forming tower, and wherein fur delivery means supplies fur to said cone and bat-wetting means wets each bat after it is formed on said cone and thereafter bat-removing means carries on a bat-removing operation, the combination of: control means including, a sequence switch having an armature assembly which is moved to a first position from a second position simultaneously with the starting of the wetting operation and which is held in said first position by an interlock circuit, a bat-removing relay switch having a solenoid in series with a switch unit of said sequence switch so that when said armature assembly is moved to said first position said switch unit is closed, timer means effective to stop the wetting operation after a predetermined period of time and to complete the circuit to said switch unit of said sequence switch thereby to initiate the bat-removing operation, switch means associated with the bat-removing means to break said interlock circuit when the bat-removing operation has been completed with the result that the armature assembly of said sequence switch is moved to said second position, and circuit means including a switching unit which is closed upon the moving of said armature assembly to said second position and which closes a circuit thereby to permit the continued operation of the apparatus.

4. Apparatus as described in claim 3 wherein the bat-removing means is of the type having a separate bat-removing mechanism for each of a plurality of cones and each bat-removing mechanism has associated therewith a control switch with all of the control switches in series and connected to help form said interlocking circuit, and wherein said switching unit which is closed upon the moving of said armature assembly to said second position is also connected to said control switches in series to form a door-actuating circuit, and a cyclic timer to exert supervisory control upon the apparatus having a switch which is closed at a predetermined time in the cycle of operations to connect said door-actuating circuit to the door-actuating means thereby to actuate the door means and permit the continued operation of the apparatus.

5. Apparatus as described in claim 3 wherein said sequence switch includes three switch units a first and second of which are closed when said armature assembly is in said first position and the third of which is closed when said armature assembly is in said second position, and wherein said switch means associated with the bat-removing means is in the form of a plurality of switches in series and connected to said first switch unit so that when said first switch unit is closed said interlock circuit is formed, and connected to said third switch unit to form a door-operating circuit which is the circuit which is closed to permit the continued operation of the apparatus.

6. In hat-making apparatus which receives fur and forms bats wherein a plurality of cones are movably mounted to be successively positioned to receive fur to form bats and suction means maintains the proper suction upon the cones during the fur depositing operation, and wherein bat-wetting means wets the bats after they are formed and thereafter the bats are removed by bat-removing means, the combination of: a wetting timer which starts its operation at the time that the wetting operation is started and which is effective a predetermined time thereafter to stop the wetting operation; a suction timer which is effective a predetermined time after the wetting operation has started to substantially cut off the suction upon the cone; a sequence switch having an armature assembly which is moved to a first position from a second position simultaneously with the starting of the wetting operation and which has incorporated therein an electrical interlock means to maintain the armature assembly in said first position, said sequence switch having a switch unit which is closed by the movement of said armature assembly to said first position and which is thereby effective to set up a bat-removing circuit through which said bat-removing means may be energized; switch means which is closed upon the stopping of the wetting operation to energize said bat-removing circuit; and switch means in said interlock circuit and actuated by the bat-removing operation to break the circuit of said interlock means whereby said armature assembly moves to said second position and said bat-removing circuit is deenergized, said sequence switch having a switch unit which is closed by the movement of said armature assembly to said second position and which completes a circuit to permit the initiating of the movement of a cone from which the bat has been removed to the position where fur will be deposited thereon.

7. In a bat former wherein fur is deposited in predetermined quantities upon cones in a forming tower which is provided with door means the opening of which permits the withdrawing of the cone with the bat thereon and the positioning of another cone to have fur deposited thereon, suction control means to cut off the suction from each cone at a time depending upon the time of removal of the cone from the forming tower, sequence switch means to control the removing of each bat from its cone after the bat has been formed and to prevent the opening of said door means and the continued operation of the apparatus if the bat-removing operations have not been completed, a sieve-roller assembly in the line of supply of the fur the stopping of which stops the feed of fur to the forming tower, cyclic control means to stop said sieve-roller assembly and thereafter to open said door means, switch means which is operated by the positioning of said door means in a fully open position and effective upon operation to restart said sieve-roller assembly, and control means to effect the immediate replacing of the cone which is in the forming tower at the time of the opening of said door means with another cone and thereafter to reclose the door means whereby a cone without a bat thereon is positioned within the forming tower and the door means is reclosed by the time the fur forwarded upon the restarting of the sieve-roller assembly reaches the forming tower.

8. In hat-making apparatus, the combination of: fur-feeding means to supply a stream of fur; fur-dividing means to divide the fur into predetermined quantities; fur-forwarding means including, a feed apron which receives the fur and carries the fur toward a forming tower, means to lift the fur in an air-borne stream to a higher level, a sieve-roller assembly including a sieve-roller to receive said air-borne stream of fur by permitting the air to escape through the outer surface of the sieve roller to the interior thereof with the result that a layer of fur is formed on said outer surface, and baffle means on the interior of said sieve-rollers to deflect the air longitudinally of said sieve-roller and out of the ends thereof and to prevent the escape of the air against the layer of fur; and control means to control simultaneously the operation of all of the apparatus including, means to stop the operation of said fur-feeding means, means to control the receiving of each predetermined quantity of fur by said sieve-roller assembly, means to operate said feed apron and said sieve-roller assembly to forward separately the various predetermined quantities of fur, and means to prevent the restarting of said feeding means if the previous quantity of fur has not been forwarded by said apron and sieve-roller assembly.

9. In hat-making apparatus of the character wherein predetermined quantities of fur are delivered to cones within a forming tower thereby to form bats which are wetted and removed, and wherein the suction upon each cone is controlled by an individually operated suction solenoid unit whereby the energization of the solenoid unit establishes the suction and the deenergization of the solenoid unit cuts off the suction, control means for the apparatus including, a solenoid-operated relay switch having an armature assembly which is moved from a second position to a first position preparatory to the transfer of one cone from the forming tower and the transfer of another cone into the forming tower, said relay switch including a transfer switch-unit which is closed by the movement of said armature assembly to said first position and which is effective to initiate the transfer of the cones, said relay switch also including a suction-control switch-unit which is operated by the moving of said armature assembly to said second position thereby to set up a suction cut-off circuit which energizes a normally closed suction relay-switch normally connecting each of the suction solenoid units with the source of power thereby to maintain suction upon the cones, said suction cut-off circuit making possible the energizing of the solenoid of said suction relay-switch thereby to open the relay-switch and break the circuits of the solenoid units, and switch means operated in accordance with the transferring to each cone into the forming tower and effective to maintain suction upon the cone as the cone is having fur deposited thereon.

10. Apparatus as described in claim 9 wherein a manually operable bypass switch is provided electrically in parallel with said suction-control switch-unit whereby the solenoid of said suction relay-switch can be energized independently of the position of the armature assembly of said solenoid-operated relay switch.

11. In hat-making apparatus of the type wherein fur is divided by a weighing mechanism into predetermined quantities and each predetermined quantity is forwarded to a forming tower and deposited upon a cone to form a bat, control means including, a cyclic timer to exert supervisory control upon the apparatus thereby to insure that the various operation sequences are completed in turn without loss of time, said cyclic timer including a switch unit which is operated at a predetermined time in the cycle of operations to initiate the forwarding of a predetermined quantity of fur from the weighing mechanism toward the forming tower, means including a relay switch forming part of a relay circuit to stop the cyclic timer thereby to delay the starting of subsequent operations in the cycle, said relay circuit extending from said switch unit through said relay switch, and means responsive to the delivery of a predetermined quantity of fur to the weighing mechanism to open said relay switch, whereby if the cyclic timer closes said switch unit before the predetermined quantity of fur has been delivered to the weighing mechanism a circuit is completed through said switch unit and said relay switch stops the cyclic timer until said predetermined quantity is delivered thereby delaying the remaining operations of the cycle.

12. Apparatus as described in claim 11 wherein the rate of delivery of fur to the weighing mechanism is decreased as the predetermined quantity of fur is approached, and wherein said relay switch is opened and closed with a switch unit which is closed to reduce the rate of delivery of the fur and is then opened when the predetermined quantity of fur has been delivered to the weighing mechanism thereby to condition the fur delivery mechanism for the delivery of the next quantity of fur, whereby the conditioning of the fur delivery mechanism for the delivery of the next quantity of fur has as an incident thereto the breaking of the relay circuit which permits the stopping of the cyclic timer.

13. In a bat former wherein the fur is divided into predetermined quantities each of which is then deposited upon a cone to form a bat, the combination of, delivery means to deliver a stream of fur and to divide the fur into predetermined quantities, a cone assembly to receive and form each predetermined quantity of fur into a bat upon a cone and to present each bat for removal from its cone, means to deliver the predetermined quantities of fur individually to said cone assembly, cyclic control means to control the operations of the apparatus and under normal conditions to carry on the dividing of the fur into predetermined quantities and the forming and removal of bats as interrelated continuous processes, means to superimpose a control effect on said cyclic control means to prevent the starting of a new cycle after a bat has been formed if the operations at the cone assembly have not been completed, and cyclic delay means to extend the time of a cycle if the predetermined quantity of fur being delivered during that cycle is deficient in amount and to permit the fur-delivery operation to continue.

JOHN E. KANE.